(12) United States Patent
Tamm et al.

(10) Patent No.: US 11,809,389 B2
(45) Date of Patent: Nov. 7, 2023

(54) SYSTEMS AND METHODS FOR RESOLVING ERRORS IN DATASETS FOR ONLINE ORDERS

(71) Applicant: SHOPIFY INC., Ottawa (CA)

(72) Inventors: Adam Renberg Tamm, Oxford (GB); Dominic Lind, Stockholm (SE); Anton Reimertz, Stockholm (SE)

(73) Assignee: SHOPIFY INC., Ottawa (CA)

( * ) Notice: Subject to any disclaimer, the term of this patent is extended or adjusted under 35 U.S.C. 154(b) by 95 days.

(21) Appl. No.: 17/231,237

(22) Filed: Apr. 15, 2021

(65) Prior Publication Data

US 2022/0335020 A1    Oct. 20, 2022

(51) Int. Cl.
| | |
|---|---|
| *G06F 16/215* | (2019.01) |
| *G06Q 30/0601* | (2023.01) |
| *G06F 16/29* | (2019.01) |
| *G06F 16/23* | (2019.01) |
| *G06F 18/22* | (2023.01) |

(52) U.S. Cl.
CPC ........ *G06F 16/215* (2019.01); *G06F 16/2365* (2019.01); *G06F 16/29* (2019.01); *G06F 18/22* (2023.01); *G06Q 30/0601* (2013.01)

(58) Field of Classification Search
None
See application file for complete search history.

(56) References Cited

U.S. PATENT DOCUMENTS

| | | | |
|---|---|---|---|
| 10,607,179 B1* | 3/2020 | Lee | .................... G06Q 10/0838 |
| 2004/0107205 A1* | 6/2004 | Burdick | ................ G06F 16/215 |
| | | | 707/999.102 |
| 2009/0006394 A1* | 1/2009 | Snapp | .................. G06F 16/2468 |

(Continued)

FOREIGN PATENT DOCUMENTS

WO    WO-0057258 A2 *    9/2000    ............. G06Q 30/02

OTHER PUBLICATIONS

Algorithms and Theory of Computation Handbook, CRC Press LLC, 1999, "Levenshtein distance", in Dictionary of Algorithms and Data Structures [online], Paul E. Black, ed. May 15, 2019. (accessed May 27, 2022) Available from: https://www.nist.gov/dads/HTML/Levenshtein.html (Year: 2019).*

(Continued)

*Primary Examiner* — Tony Mahmoudi
*Assistant Examiner* — Umar Mian

(57) ABSTRACT

During a checkout process in an online store, a user may provide data that facilitates future communication between the user and a merchant of the online store. However, this communication may be impeded when the user-provided data contains errors. Embodiments of the present disclosure provide systems and methods for resolving errors in user-provided data using stored datasets. According to one embodiment, a method includes determining that an identifier for an online order contains an error. The method also includes determining, based on a comparison between the identifier and multiple stored identifiers, that the identifier corresponds to a particular stored identifier within a defined tolerance. The method further includes generating an option for a user associated with the particular stored identifier to confirm an association between the particular stored identifier and the online order.

18 Claims, 12 Drawing Sheets

(56) References Cited

U.S. PATENT DOCUMENTS

| | | | | |
|---|---|---|---|---|
| 2014/0258032 A1* | 9/2014 | Psota | ................. | G06Q 30/0609 |
| | | | | 705/26.35 |
| 2017/0236060 A1* | 8/2017 | Ignatyev | ............. | G06F 16/2365 |
| | | | | 706/46 |
| 2017/0295134 A1* | 10/2017 | Isenberg | ................. | H04L 51/48 |
| 2019/0141021 A1* | 5/2019 | Isaacson | ................ | G06Q 50/01 |

OTHER PUBLICATIONS

Boytsov, Leonid (2011). "Indexing Methods for Approximate Dictionary Searching: Comparative Analysis". ACM Journal of Experimental Algorithmics 16. 93 pages. doi: 10.1145/1963190.1963191.

* cited by examiner

FIG. 2

Customer Dataset

| Customer Name | Shipping Address | Email | Phone Number |
|---|---|---|---|
| Louisa Hamilton | 125 Causeway Drive<br>Toronto, Ontario<br>M1A 5A3<br>Canada | lhamilton@allemail.ca ← 916 | 416-555-9709 |
| Lynn-Miranda Hamilton | 450 Violet Avenue<br>Ottawa, Ontario   610<br>K1B 5Y3<br>Canada | lmhamilton@example.com ← 918 | 613-555-4690 |
| Linda Harrison | 1640 Appleton Drive<br>Vancouver, British Columbia<br>V4J 3K0 | lmharrison@example.com ← 920 | 604-555-7451 |

SYSTEMS AND METHODS FOR RESOLVING ERRORS IN DATASETS FOR ONLINE ORDERS

FIELD

The present application relates to resolving errors in datasets and, in particular embodiments, to resolving errors in datasets for online orders.

BACKGROUND

During a checkout process in an online store, a customer may provide data that facilitates future communication between the customer and a merchant of the online store. An example of such data is an email address. After the checkout process is complete and an online order has been created, the merchant may use the data provided by the customer to send an order confirmation message and/or shipping information to the customer, for example. However, communication issues may arise if the data provided by the customer contains an error.

SUMMARY

Some embodiments of the present disclosure provide systems and methods for resolving errors in user-provided data using stored datasets. For example, e-commerce platforms may store relatively large datasets containing user data (as may, for example, be associated with accounts or previous orders) that may be leveraged to correct an error in an email address, a telephone number and/or a personal identification number provided by a user. The corrected email address, telephone number and/or personal identification number may then be used to facilitate communication with the user. In this way, embodiments disclosed herein may improve communication between computing systems and/or user devices in an e-commerce setting.

According to one aspect of the present disclosure, there is provided a computer-implemented method that may include receiving a dataset for an online order, determining that a data element of the dataset includes a first identifier and determining that the first identifier contains an error. The first identifier may include at least one of an email address, a telephone number, or a personal identification number. In some embodiments, determining that the first identifier contains the error includes transmitting a message to the first identifier and receiving, in response to the message, an indication that the first identifier contains the error. The indication that the first identifier contains the error may be or include a delivery failure notification for the message, for example.

The method may further include determining, based on a comparison between the first identifier and a plurality of stored identifiers, that the first identifier corresponds to a particular stored identifier of the plurality of stored identifiers within a defined tolerance. Optionally, determining that the first identifier corresponds to the particular stored identifier within the defined tolerance is based on a comparison between the first identifier and each of the plurality of stored identifiers. In some embodiments, this determining step includes calculating an edit distance between the first identifier and the particular stored identifier and determining that the edit distance is within the defined tolerance.

In some embodiments, the dataset for the online order further includes a second identifier other than the first identifier. The plurality of stored identifiers may include a further stored identifier associated with the particular stored identifier. The further stored identifier may include at least one of a postal address, payment information or an internet protocol (IP) address, for example. In these embodiments, determining that the first identifier corresponds to the particular stored identifier includes determining, based on a comparison between the second identifier and the plurality of stored identifiers, that the second identifier matches the further stored identifier.

The method may further include generating an option for a user associated with the particular stored identifier to confirm an association between the particular stored identifier and the online order. In some embodiments, the method may also include receiving, from a user device associated with the user, a selection of the option to confirm the association between the particular stored identifier and the online order and, responsive to receiving the selection, storing the association between the particular stored identifier and the online order. Optionally, the particular stored identifier corresponds to a user account associated with the user, and storing the association between the particular stored identifier and the online order includes associating the online order with the user account. Further, generating the option to confirm the association between the particular stored identifier and the online order may include generating an indication of the option for presentation on a screen page of the user account.

According to another aspect of the present disclosure, there is provided a system including memory to store a plurality of stored identifiers and at least one processor. The at least one processor may be to receive a dataset for an online order; determine that a data element of the dataset includes a first identifier; determine that the first identifier contains an error; determine, based on a comparison between the first identifier and the plurality of stored identifiers, that the first identifier corresponds to a particular stored identifier of the plurality of stored identifiers within a defined tolerance; and generate an option for a user associated with the particular stored identifier to confirm an association between the particular stored identifier and the online order. The first identifier may include at least one of an email address, a telephone number, or a personal identification number.

In some embodiments, the at least one processor is to transmit a message to the first identifier, and receive, in response to the message, an indication that the first identifier contains the error. This indication that the first identifier contains the error may include a delivery failure notification for the message.

In some embodiments, the at least one processor is to calculate an edit distance between the first identifier and the particular stored identifier, and determine that the edit distance is within the defined tolerance.

In some embodiments, the dataset for the online order further includes a second identifier other than the first identifier, and the plurality of stored identifiers include a further stored identifier associated with the particular stored identifier. The at least one processor may be to determine, based on a comparison between the second identifier and the plurality of stored identifiers, that the second identifier matches the further stored identifier. The second identifier may include at least one of a postal address, payment information or an IP address.

In some embodiments, the at least one processor is to receive, from a user device associated with the user, a selection of the option to confirm the association between the particular stored identifier and the online order. The memory may store the association between the particular stored identifier and the online order responsive to receiving the selection. Optionally, the particular stored identifier corresponds to a user account associated with the user, and the memory may store an association between the online order and the user account. The at least one processor may further be to generate an indication of the option for presentation on a screen page of the user account.

In some embodiments, the at least one processor is to determine that the first identifier corresponds to the particular stored identifier within the defined tolerance based on a comparison between the first identifier and each of the plurality of stored identifiers.

According to yet another aspect of the present disclosure, there is provided a non-transitory computer readable medium storing computer executable instructions. When executed by a computer, the computer executable instructions may cause the computer to receive a dataset for an online order; determine that a data element of the dataset includes a first identifier; determine that the first identifier contains an error; determine, based on a comparison between the first identifier and a plurality of stored identifiers, that the first identifier corresponds to a particular stored identifier of the plurality of stored identifiers within a defined tolerance; and generate an option for a user associated with the particular stored identifier to confirm an association between the particular stored identifier and the online order.

BRIEF DESCRIPTION OF THE DRAWINGS

Embodiments will be described, by way of example only, with reference to the accompanying figures wherein:

FIG. 2 is an example of a home page of an administrator, according to an embodiment;

FIG. 9 illustrates a dataset that may be used to determine a stored email address that corresponds to the user-provided email address of FIG. 7;

FIG. 10 illustrates another email message that is sent to the stored email address of FIG. 9 on behalf of the merchant of the online store of FIG. 6;

FIG. 12 illustrates another screen page of the user account of FIG. 11 that includes an order history for the user account.

DETAILED DESCRIPTION

For illustrative purposes, specific example embodiments will now be explained in greater detail below in conjunction with the figures.

An Example e-Commerce Platform

Although integration with a commerce platform is not required, in some embodiments, the methods disclosed herein may be performed on or in association with a commerce platform such as an e-commerce platform. Therefore, an example of a commerce platform will be described.

Figure 1:
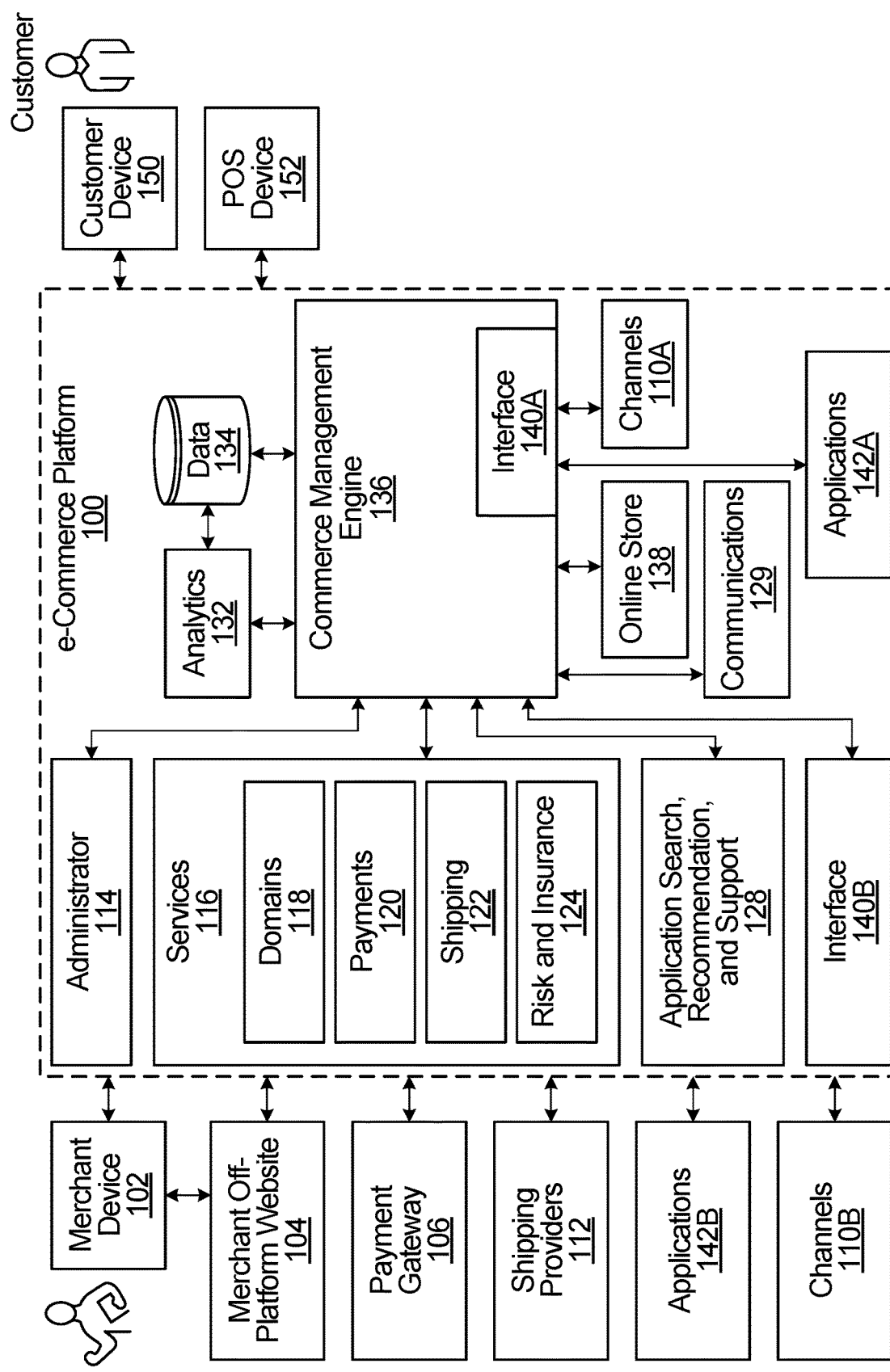
FIG. 1 is a block diagram of an e-commerce platform, according to an embodiment.

FIG. 1 illustrates an example e-commerce platform 100, according to one embodiment. The e-commerce platform 100 may be used to provide merchant products and services to customers. While the disclosure contemplates using the apparatus, system, and process to purchase products and services, for simplicity the description herein will refer to products. All references to products throughout this disclosure should also be understood to be references to products and/or services, including, for example, physical products, digital content (e.g., music, videos, games), software, tickets, subscriptions, services to be provided, and the like.

While the disclosure throughout contemplates that a 'merchant' and a 'customer' may be more than individuals, for simplicity the description herein may generally refer to merchants and customers as such. All references to merchants and customers throughout this disclosure should also be understood to be references to groups of individuals, companies, corporations, computing entities, and the like, and may represent for-profit or not-for-profit exchange of products. Further, while the disclosure throughout refers to 'merchants' and 'customers', and describes their roles as such, the e-commerce platform 100 should be understood to more generally support users in an e-commerce environment, and all references to merchants and customers throughout this disclosure should also be understood to be references to users, such as where a user is a merchant-user (e.g., a seller, retailer, wholesaler, or provider of products), a customer-user (e.g., a buyer, purchase agent, consumer, or user of products), a prospective user (e.g., a user browsing and not yet committed to a purchase, a user evaluating the e-commerce platform 100 for potential use in marketing and selling products, and the like), a service provider user (e.g., a shipping provider 112, a financial provider, and the like), a company or corporate user (e.g., a company representative for purchase, sales, or use of products; an enterprise user; a customer relations or customer management agent, and the like), an information technology user, a computing entity user (e.g., a computing bot for purchase, sales, or use of products), and the like. Furthermore, it may be recognized that while a given user may act in a given role (e.g., as a merchant) and their associated device may be referred to accordingly (e.g., as a merchant device) in one context, that same individual may act in a different role in another context (e.g., as a customer) and that same or another associated device may be referred to accordingly (e.g., as a customer device). For example, an individual may be a merchant for one type of product (e.g., shoes), and a customer/consumer of other types of products (e.g., groceries). In another example, an individual may be both a consumer and a merchant of the same type of product. In a particular example, a merchant that trades in a particular category of goods may act as a customer for that same category of goods when they order from a wholesaler (the wholesaler acting as merchant).

The e-commerce platform 100 provides merchants with online services/facilities to manage their business. The facilities described herein are shown implemented as part of the platform 100 but could also be configured separately from the platform 100, in whole or in part, as stand-alone services. Furthermore, such facilities may, in some embodiments, may, additionally or alternatively, be provided by one or more providers/entities.

In the example of FIG. 1, the facilities are deployed through a machine, service or engine that executes computer software, modules, program codes, and/or instructions on one or more processors which, as noted above, may be part of or external to the platform 100. Merchants may utilize the e-commerce platform 100 for enabling or managing commerce with customers, such as by implementing an e-commerce experience with customers through an online store 138, applications 142A-B, channels 110A-B, and/or through point of sale (POS) devices 152 in physical locations (e.g., a physical storefront or other location such as through a kiosk, terminal, reader, printer, 3D printer, and the like). A merchant may utilize the e-commerce platform 100 as a sole commerce presence with customers, or in conjunction with other merchant commerce facilities, such as through a physical store (e.g., 'brick-and-mortar' retail stores), a merchant off-platform website 104 (e.g., a commerce Internet website or other internet or web property or asset supported by or on behalf of the merchant separately from the e-commerce platform 100), an application 142B, and the like. However, even these 'other' merchant commerce facilities may be incorporated into or communicate with the e-commerce platform 100, such as where POS devices 152 in a physical store of a merchant are linked into the e-commerce platform 100, where a merchant off-platform website 104 is tied into the e-commerce platform 100, such as, for example, through 'buy buttons' that link content from the merchant off platform website 104 to the online store 138, or the like.

The online store 138 may represent a multi-tenant facility comprising a plurality of virtual storefronts. In embodiments, merchants may configure and/or manage one or more storefronts in the online store 138, such as, for example, through a merchant device 102 (e.g., computer, laptop computer, mobile computing device, and the like), and offer products to customers through a number of different channels 110A-B (e.g., an online store 138; an application 142A-B; a physical storefront through a POS device 152; an electronic marketplace, such, for example, through an electronic buy button integrated into a website or social media channel such as on a social network, social media page, social media messaging system; and/or the like). A merchant may sell across channels 110A-B and then manage their sales through the e-commerce platform 100, where channels 110A may be provided as a facility or service internal or external to the e-commerce platform 100. A merchant may, additionally or alternatively, sell in their physical retail store, at pop ups, through wholesale, over the phone, and the like, and then manage their sales through the e-commerce platform 100. A merchant may employ all or any combination of these operational modalities. Notably, it may be that by employing a variety of and/or a particular combination of modalities, a merchant may improve the probability and/or volume of sales. Throughout this disclosure the terms online store 138 and storefront may be used synonymously to refer to a merchant's online e-commerce service offering through the e-commerce platform 100, where an online store 138 may refer either to a collection of storefronts supported by the e-commerce platform 100 (e.g., for one or a plurality of merchants) or to an individual merchant's storefront (e.g., a merchant's online store).

In some embodiments, a customer may interact with the platform 100 through a customer device 150 (e.g., computer, laptop computer, mobile computing device, or the like), a POS device 152 (e.g., retail device, kiosk, automated (self-service) checkout system, or the like), and/or any other commerce interface device known in the art. The e-commerce platform 100 may enable merchants to reach customers through the online store 138, through applications 142A-B, through POS devices 152 in physical locations (e.g., a merchant's storefront or elsewhere), to communicate with customers via electronic communication facility 129, and/or the like so as to provide a system for reaching customers and facilitating merchant services for the real or virtual pathways available for reaching and interacting with customers.

In some embodiments, and as described further herein, the e-commerce platform 100 may be implemented through a processing facility. Such a processing facility may include a processor and a memory. The processor may be a hardware processor. The memory may be and/or may include a transitory memory such as for example, random access memory (RAM), and/or a non-transitory memory such as, for example, a non-transitory computer readable medium such as, for example, persisted storage (e.g., magnetic storage). The processing facility may store a set of instructions (e.g., in the memory) that, when executed, cause the e-commerce platform 100 to perform the e-commerce and support functions as described herein. The processing facility may be or may be a part of one or more of a server, client, network infrastructure, mobile computing platform, cloud computing platform, stationary computing platform, and/or some other computing platform, and may provide electronic connectivity and communications between and amongst the components of the e-commerce platform 100, merchant devices 102, payment gateways 106, applications 142A-B, channels 110A-B, shipping providers 112, customer devices 150, point of sale devices 152, etc. In some implementations, the processing facility may be or may include one or more such computing devices acting in concert. For example, it may be that a plurality of co-operating computing devices serves as/to provide the processing facility. The e-commerce platform 100 may be implemented as or using one or more of a cloud computing service, software as a service (SaaS), infrastructure as a service (IaaS), platform as a service (PaaS), desktop as a service (DaaS), managed software as a service (MSaaS), mobile backend as a service (MBaaS), information technology management as a service (ITMaaS), and/or the like. For example, it may be that the underlying software implementing the facilities described herein (e.g., the online store 138) is provided as a service, and is centrally hosted (e.g., and then accessed by users via a web browser or other application, and/or through customer devices 150, POS devices 152, and/or the like). In some embodiments, elements of the e-commerce platform 100 may be implemented to operate and/or integrate with various other platforms and operating systems.

In some embodiments, the facilities of the e-commerce platform 100 (e.g., the online store 138) may serve content to a customer device 150 (using data 134) such as, for example, through a network connected to the e-commerce platform 100. For example, the online store 138 may serve or send content in response to requests for data 134 from the customer device 150, where a browser (or other application) connects to the online store 138 through a network using a network communication protocol (e.g., an internet protocol).

The content may be written in machine readable language and may include Hypertext Markup Language (HTML), template language, JavaScript, and the like, and/or any combination thereof.

In some embodiments, online store 138 may be or may include service instances that serve content to customer devices and allow customers to browse and purchase the various products available (e.g., add them to a cart, purchase through a buy-button, and the like). Merchants may also customize the look and feel of their website through a theme system, such as, for example, a theme system where merchants can select and change the look and feel of their online store 138 by changing their theme while having the same underlying product and business data shown within the online store's product information. It may be that themes can be further customized through a theme editor, a design interface that enables users to customize their website's design with flexibility. Additionally or alternatively, it may be that themes can, additionally or alternatively, be customized using theme-specific settings such as, for example, settings as may change aspects of a given theme, such as, for example, specific colors, fonts, and pre-built layout schemes. In some implementations, the online store may implement a content management system for website content. Merchants may employ such a content management system in authoring blog posts or static pages and publish them to their online store 138, such as through blogs, articles, landing pages, and the like, as well as configure navigation menus. Merchants may upload images (e.g., for products), video, content, data, and the like to the e-commerce platform 100, such as for storage by the system (e.g., as data 134). In some embodiments, the e-commerce platform 100 may provide functions for manipulating such images and content such as, for example, functions for resizing images, associating an image with a product, adding and associating text with an image, adding an image for a new product variant, protecting images, and the like.

As described herein, the e-commerce platform 100 may provide merchants with sales and marketing services for products through a number of different channels 110A-B, including, for example, the online store 138, applications 142A-B, as well as through physical POS devices 152 as described herein. The e-commerce platform 100 may, additionally or alternatively, include business support services 116, an administrator 114, a warehouse management system, and the like associated with running an on-line business, such as, for example, one or more of providing a domain registration service 118 associated with their online store, payment services 120 for facilitating transactions with a customer, shipping services 122 for providing customer shipping options for purchased products, fulfillment services for managing inventory, risk and insurance services 124 associated with product protection and liability, merchant billing, and the like. Services 116 may be provided via the e-commerce platform 100 or in association with external facilities, such as through a payment gateway 106 for payment processing, shipping providers 112 for expediting the shipment of products, and the like.

In some embodiments, the e-commerce platform 100 may be configured with shipping services 122 (e.g., through an e-commerce platform shipping facility or through a third-party shipping carrier), to provide various shipping-related information to merchants and/or their customers such as, for example, shipping label or rate information, real-time delivery updates, tracking, and/or the like.

Figure 2:
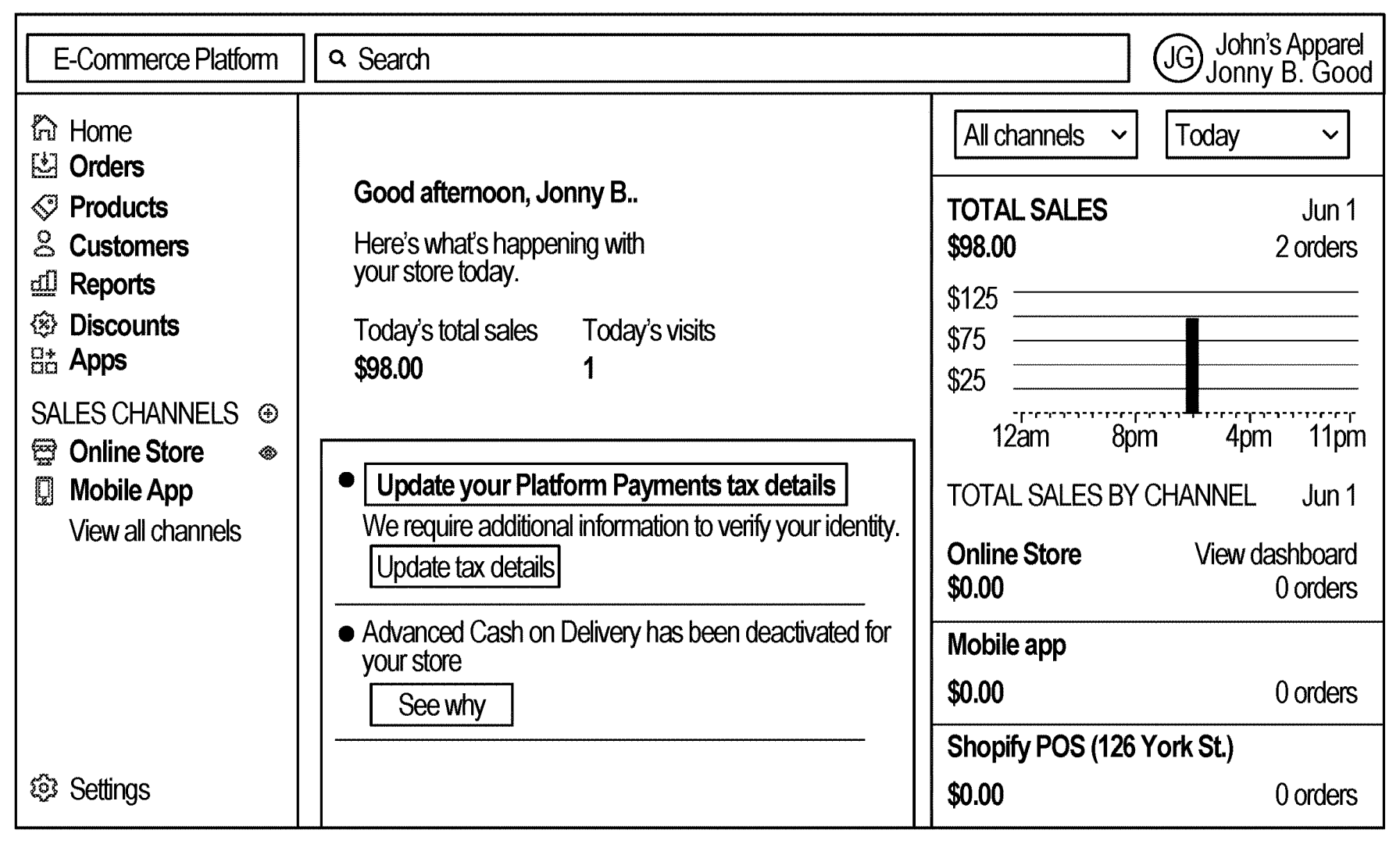

FIG. 2 depicts a non-limiting embodiment for a home page of an administrator 114. The administrator 114 may be referred to as an administrative console and/or an administrator console. The administrator 114 may show information about daily tasks, a store's recent activity, and the next steps a merchant can take to build their business. In some embodiments, a merchant may log in to the administrator 114 via a merchant device 102 (e.g., a desktop computer or mobile device), and manage aspects of their online store 138, such as, for example, viewing the online store's 138 recent visit or order activity, updating the online store's 138 catalog, managing orders, and/or the like. In some embodiments, the merchant may be able to access the different sections of the administrator 114 by using a sidebar, such as the one shown on FIG. 2. Sections of the administrator 114 may include various interfaces for accessing and managing core aspects of a merchant's business, including orders, products, customers, available reports and discounts. The administrator 114 may, additionally or alternatively, include interfaces for managing sales channels for a store including the online store 138, mobile application(s) made available to customers for accessing the store (Mobile App), POS devices, and/or a buy button. The administrator 114 may, additionally or alternatively, include interfaces for managing applications (apps) installed on the merchant's account; and settings applied to a merchant's online store 138 and account. A merchant may use a search bar to find products, pages, or other information in their store.

More detailed information about commerce and visitors to a merchant's online store 138 may be viewed through reports or metrics. Reports may include, for example, acquisition reports, behavior reports, customer reports, finance reports, marketing reports, sales reports, product reports, and custom reports. The merchant may be able to view sales data for different channels 110A-B from different periods of time (e.g., days, weeks, months, and the like), such as by using drop-down menus. An overview dashboard may also be provided for a merchant who wants a more detailed view of the store's sales and engagement data. An activity feed in the home metrics section may be provided to illustrate an overview of the activity on the merchant's account. For example, by clicking on a 'view all recent activity' dashboard button, the merchant may be able to see a longer feed of recent activity on their account. A home page may show notifications about the merchant's online store 138, such as based on account status, growth, recent customer activity, order updates, and the like. Notifications may be provided to assist a merchant with navigating through workflows configured for the online store 138, such as, for example, a payment workflow, an order fulfillment workflow, an order archiving workflow, a return workflow, and the like.

The e-commerce platform 100 may provide for a communications facility 129 and associated merchant interface for providing electronic communications and marketing, such as utilizing an electronic messaging facility for collecting and analyzing communication interactions between merchants, customers, merchant devices 102, customer devices 150, POS devices 152, and the like, to aggregate and analyze the communications, such as for increasing sale conversions, and the like. For instance, a customer may have a question related to a product, which may produce a dialog between the customer and the merchant (or an automated processor-based agent/chatbot representing the merchant), where the communications facility 129 is configured to provide automated responses to customer requests and/or provide recommendations to the merchant on how to respond such as, for example, to improve the probability of a sale.

The e-commerce platform 100 may provide a financial facility 120 for secure financial transactions with customers, such as through a secure card server environment. The e-commerce platform 100 may store credit card information, such as in payment card industry data (PCI) environments (e.g., a card server), to reconcile financials, bill merchants, perform automated clearing house (ACH) transfers between the e-commerce platform 100 and a merchant's bank account, and the like. The financial facility 120 may also provide merchants and buyers with financial support, such as through the lending of capital (e.g., lending funds, cash advances, and the like) and provision of insurance. In some embodiments, online store 138 may support a number of independently administered storefronts and process a large volume of transactional data on a daily basis for a variety of products and services. Transactional data may include any customer information indicative of a customer, a customer account or transactions carried out by a customer such as, for example, contact information, billing information, shipping information, returns/refund information, discount/offer information, payment information, or online store events or information such as page views, product search information (search keywords, click-through events), product reviews, abandoned carts, and/or other transactional information associated with business through the e-commerce platform 100. In some embodiments, the e-commerce platform 100 may store this data in a data facility 134. Referring again to FIG. 1, in some embodiments the e-commerce platform 100 may include a commerce management engine 136 such as may be configured to perform various workflows for task automation or content management related to products, inventory, customers, orders, suppliers, reports, financials, risk and fraud, and the like. In some embodiments, additional functionality may, additionally or alternatively, be provided through applications 142A-B to enable greater flexibility and customization required for accommodating an ever-growing variety of online stores, POS devices, products, and/or services. Applications 142A may be components of the e-commerce platform 100 whereas applications 142B may be provided or hosted as a third-party service external to e-commerce platform 100. The commerce management engine 136 may accommodate store-specific workflows and in some embodiments, may incorporate the administrator 114 and/or the online store 138.

Implementing functions as applications 142A-B may enable the commerce management engine 136 to remain responsive and reduce or avoid service degradation or more serious infrastructure failures, and the like.

Although isolating online store data can be important to maintaining data privacy between online stores 138 and merchants, there may be reasons for collecting and using cross-store data, such as for example, with an order risk assessment system or a platform payment facility, both of which require information from multiple online stores 138 to perform well. In some embodiments, it may be preferable to move these components out of the commerce management engine 136 and into their own infrastructure within the e-commerce platform 100.

Platform payment facility 120 is an example of a component that utilizes data from the commerce management engine 136 but is implemented as a separate component or service. The platform payment facility 120 may allow customers interacting with online stores 138 to have their payment information stored safely by the commerce management engine 136 such that they only have to enter it once. When a customer visits a different online store 138, even if they have never been there before, the platform payment facility 120 may recall their information to enable a more rapid and/or potentially less-error prone (e.g., through avoidance of possible mis-keying of their information if they needed to instead re-enter it) checkout. This may provide a cross-platform network effect, where the e-commerce platform 100 becomes more useful to its merchants and buyers as more merchants and buyers join, such as because there are more customers who checkout more often because of the ease of use with respect to customer purchases. To maximize the effect of this network, payment information for a given customer may be retrievable and made available globally across multiple online stores 138.

For functions that are not included within the commerce management engine 136, applications 142A-B provide a way to add features to the e-commerce platform 100 or individual online stores 138. For example, applications 142A-B may be able to access and modify data on a merchant's online store 138, perform tasks through the administrator 114, implement new flows for a merchant through a user interface (e.g., that is surfaced through extensions/API), and the like. Merchants may be enabled to discover and install applications 142A-B through application search, recommendations, and support 128. In some embodiments, the commerce management engine 136, applications 142A-B, and the administrator 114 may be developed to work together. For instance, application extension points may be built inside the commerce management engine 136, accessed by applications 142A and 142B through the interfaces 140B and 140A to deliver additional functionality, and surfaced to the merchant in the user interface of the administrator 114.

In some embodiments, applications 142A-B may deliver functionality to a merchant through the interface 140A-B, such as where an application 142A-B is able to surface transaction data to a merchant (e.g., App: "Engine, surface my app data in the Mobile App or administrator 114"), and/or where the commerce management engine 136 is able to ask the application to perform work on demand (Engine: "App, give me a local tax calculation for this checkout").

Applications 142A-B may be connected to the commerce management engine 136 through an interface 140A-B (e.g., through REST (REpresentational State Transfer) and/or GraphQL APIs) to expose the functionality and/or data available through and within the commerce management engine 136 to the functionality of applications. For instance, the e-commerce platform 100 may provide API interfaces 140A-B to applications 142A-B which may connect to products and services external to the platform 100. The flexibility offered through use of applications and APIs (e.g., as offered for application development) enable the e-commerce platform 100 to better accommodate new and unique needs of merchants or to address specific use cases without requiring constant change to the commerce management engine 136. For instance, shipping services 122 may be integrated with the commerce management engine 136 through a shipping or carrier service API, thus enabling the e-commerce platform 100 to provide shipping service functionality without directly impacting code running in the commerce management engine 136.

Depending on the implementation, applications 142A-B may utilize APIs to pull data on demand (e.g., customer creation events, product change events, or order cancelation events, etc.) or have the data pushed when updates occur. A subscription model may be used to provide applications 142A-B with events as they occur or to provide updates with respect to a changed state of the commerce management engine 136. In some embodiments, when a change related to an update event subscription occurs, the commerce management engine 136 may post a request, such as to a predefined callback URL. The body of this request may contain a new state of the object and a description of the action or event. Update event subscriptions may be created manually, in the administrator facility 114, or automatically (e.g., via the API 140A-B). In some embodiments, update events may be queued and processed asynchronously from a state change that triggered them, which may produce an update event notification that is not distributed in real-time or near-real time.

In some embodiments, the e-commerce platform 100 may provide one or more of application search, recommendation and support 128. Application search, recommendation and support 128 may include developer products and tools to aid in the development of applications, an application dashboard (e.g., to provide developers with a development interface, to administrators for management of applications, to merchants for customization of applications, and the like), facilities for installing and providing permissions with respect to providing access to an application 142A-B (e.g., for public access, such as where criteria must be met before being installed, or for private use by a merchant), application searching to make it easy for a merchant to search for applications 142A-B that satisfy a need for their online store 138, application recommendations to provide merchants with suggestions on how they can improve the user experience through their online store 138, and the like. In some embodiments, applications 142A-B may be assigned an application identifier (ID), such as for linking to an application (e.g., through an API), searching for an application, making application recommendations, and the like.

Applications 142A-B may be grouped roughly into three categories: customer-facing applications, merchant-facing applications, integration applications, and the like. Customer-facing applications 142A-B may include an online store 138 or channels 110A-B that are places where merchants can list products and have them purchased (e.g., the online store, applications for flash sales (e.g., merchant products or from opportunistic sales opportunities from third-party sources), a mobile store application, a social media channel, an application for providing wholesale purchasing, and the like). Merchant-facing applications 142A-B may include applications that allow the merchant to administer their online store 138 (e.g., through applications related to the web or website or to mobile devices), run their business (e.g., through applications related to POS devices), to grow their business (e.g., through applications related to shipping (e.g., drop shipping), use of automated agents, use of process flow development and improvements), and the like. Integration applications may include applications that provide useful integrations that participate in the running of a business, such as shipping providers 112 and payment gateways 106.

As such, the e-commerce platform 100 can be configured to provide an online shopping experience through a flexible system architecture that enables merchants to connect with customers in a flexible and transparent manner. A typical customer experience may be better understood through an embodiment example purchase workflow, where the customer browses the merchant's products on a channel 110A-B, adds what they intend to buy to their cart, proceeds to checkout, and pays for the content of their cart resulting in the creation of an order for the merchant. The merchant may then review and fulfill (or cancel) the order. The product is then delivered to the customer. If the customer is not satisfied, they might return the products to the merchant.

In an example embodiment, a customer may browse a merchant's products through a number of different channels 110A-B such as, for example, the merchant's online store 138, a physical storefront through a POS device 152; an electronic marketplace, through an electronic buy button integrated into a website or a social media channel). In some cases, channels 110A-B may be modeled as applications 142A-B A merchandising component in the commerce management engine 136 may be configured for creating, and managing product listings (using product data objects or models for example) to allow merchants to describe what they want to sell and where they sell it. The association between a product listing and a channel may be modeled as a product publication and accessed by channel applications, such as via a product listing API. A product may have many attributes and/or characteristics, like size and color, and many variants that expand the available options into specific combinations of all the attributes, like a variant that is size extra-small and green, or a variant that is size large and blue. Products may have at least one variant (e.g., a "default variant") created for a product without any options. To facilitate browsing and management, products may be grouped into collections, provided product identifiers (e.g., stock keeping unit (SKU)) and the like. Collections of products may be built by either manually categorizing products into one (e.g., a custom collection), by building rulesets for automatic classification (e.g., a smart collection), and the like. Product listings may include 2D images, 3D images or models, which may be viewed through a virtual or augmented reality interface, and the like.

In some embodiments, a shopping cart object is used to store or keep track of the products that the customer intends to buy. The shopping cart object may be channel specific and can be composed of multiple cart line items, where each cart line item tracks the quantity for a particular product variant. Since adding a product to a cart does not imply any commitment from the customer or the merchant, and the expected lifespan of a cart may be in the order of minutes (not days), cart objects/data representing a cart may be persisted to an ephemeral data store.

The customer then proceeds to checkout. A checkout object or page generated by the commerce management engine 136 may be configured to receive customer information to complete the order such as the customer's contact information, billing information and/or shipping details. If the customer inputs their contact information but does not proceed to payment, the e-commerce platform 100 may (e.g., via an abandoned checkout component) to transmit a message to the customer device 150 to encourage the customer to complete the checkout. For those reasons, checkout objects can have much longer lifespans than cart objects (hours or even days) and may therefore be persisted. Customers then pay for the content of their cart resulting in the creation of an order for the merchant. In some embodiments, the commerce management engine 136 may be configured to communicate with various payment gateways and services 106 (e.g., online payment systems, mobile payment systems, digital wallets, credit card gateways) via a payment processing component. The actual interactions with the payment gateways 106 may be provided through a card server environment. At the end of the checkout process, an order is created. An order is a contract of sale between the merchant and the customer where the merchant agrees to provide the goods and services listed on the order (e.g., order line items, shipping line items, and the like) and the customer agrees to provide payment (including taxes). Once an order is created, an order confirmation notification may be sent to the customer and an order placed notification sent to the merchant via a notification component. Inventory may be reserved when a payment processing job starts to avoid over-selling (e.g., merchants may control this behavior using an inventory policy or configuration for each variant). Inventory reservation may have a short time span (minutes) and may need to be fast and scalable to support flash sales or "drops", which are events during which a discount, promotion or limited inventory of a product may be offered for sale for buyers in a particular location and/or for a particular (usually short) time. The reservation is released if the payment fails. When the payment succeeds, and an order is created, the reservation is converted into a permanent (long-term) inventory commitment allocated to a specific location. An inventory component of the commerce management engine 136 may record where variants are stocked, and tracks quantities for variants that have inventory tracking enabled. It may decouple product variants (a customer-facing concept representing the template of a product listing) from inventory items (a merchant-facing concept that represents an item whose quantity and location is managed). An inventory level component may keep track of quantities that are available for sale, committed to an order or incoming from an inventory transfer component (e.g., from a vendor).

The merchant may then review and fulfill (or cancel) the order. A review component of the commerce management engine 136 may implement a business process merchant's use to ensure orders are suitable for fulfillment before actually fulfilling them. Orders may be fraudulent, require verification (e.g., ID checking), have a payment method which requires the merchant to wait to make sure they will receive their funds, and the like. Risks and recommendations may be persisted in an order risk model. Order risks may be generated from a fraud detection tool, submitted by a third-party through an order risk API, and the like. Before proceeding to fulfillment, the merchant may need to capture the payment information (e.g., credit card information) or wait to receive it (e.g., via a bank transfer, check, and the like) before it marks the order as paid. The merchant may now prepare the products for delivery. In some embodiments, this business process may be implemented by a fulfillment component of the commerce management engine 136. The fulfillment component may group the line items of the order into a logical fulfillment unit of work based on an inventory location and fulfillment service. The merchant may review, adjust the unit of work, and trigger the relevant fulfillment services, such as through a manual fulfillment service (e.g., at merchant managed locations) used when the merchant picks and packs the products in a box, purchase a shipping label and input its tracking number, or just mark the item as fulfilled. Alternatively, an API fulfillment service may trigger a third-party application or service to create a fulfillment record for a third-party fulfillment service. Other possibilities exist for fulfilling an order. If the customer is not satisfied, they may be able to return the product(s) to the merchant. The business process merchants may go through to "un-sell" an item may be implemented by a return component. Returns may consist of a variety of different actions, such as a restock, where the product that was sold actually comes back into the business and is sellable again; a refund, where the money that was collected from the customer is partially or fully returned; an accounting adjustment noting how much money was refunded (e.g., including if there was any restocking fees or goods that weren't returned and remain in the customer's hands); and the like. A return may represent a change to the contract of sale (e.g., the order), and where the e-commerce platform 100 may make the merchant aware of compliance issues with respect to legal obligations (e.g., with respect to taxes). In some embodiments, the e-commerce platform 100 may enable merchants to keep track of changes to the contract of sales over time, such as implemented through a sales model component (e.g., an append-only date-based ledger that records sale-related events that happened to an item).

Resolving Errors in User-Provided Data

A merchant may use information or data that is provided by a customer during a checkout process to communicate with that customer after an online order has been created. In some cases, email may provide an important channel for communication between merchants and customers in an e-commerce setting. For example, a customer may provide their email address during a checkout process in the online store 138, which may allow the merchant to communicate with the customer after the checkout process is completed and an order has been created. An email message may be transmitted to the customer device 150 by the e-commerce platform 100 and/or by the merchant device 102. Examples of such an email message include an order confirmation message and/or a message related to order fulfillment. In some cases, order tracking information and/or shipping information may be provided to the customer via email, including shipping confirmation messages, tracking numbers and/or expected delivery dates, for example. If necessary, a merchant may also communicate with the customer to indicate that the online order cannot be fulfilled, for example, if the merchant's inventory of the purchased product has been depleted. Email communication between the merchant and the customer could then facilitate a refund for the customer or a conversion of the order to a different product sold by the merchant.

To enable the communication outlined above, the completion of a checkout process may require the provision of an email address. However, problems may arise when a customer incorrectly enters their email address during the checkout process. Verifying that the email address has been correctly entered might not be required to complete the checkout process, and might instead be a secondary step that occurs after the checkout process is complete. This may lead to situations where a payment for an online order has been captured, but the email address provided by the customer contains typographical errors. An error in the email address provided by the customer may hinder or even prevent the post-purchase exchange of information between the customer and the merchant.

It should be noted that, in addition to email addresses, errors in other types of user identifiers are also contemplated. For example, a customer may be asked or required to provide contact information or communication "handles" other than an email address during a checkout process to facilitate post-purchase communication with the customer. Examples of such communication handles include a phone number, a personal identification number and/or a social media identifier. For example, a merchant could use a telephone number, a personal identification number and/or a social media account of a customer to send messages (e.g., short message service (SMS) messages) to the customer. Similar to email addresses, errors in these identifiers could impede communication between the customer and a merchant. Therefore, while some examples and embodiments provided herein relate to errors in email addresses, errors in other types of user-provided identifiers are also possible.

A checkout process may implement one or more methods to partially validate a customer-provided identifier before creating an order. However, these methods might not always ensure that an error-free identifier has been provided. In some cases, a checkout process may confirm that a customer-provided identifier has a valid or appropriate format. A valid email address format may be a standardized format, such as formats standardized by the Internet Engineering Task Force (IETF). For example, a valid email address format may be any string that begins with a local-part (which is also referred to as a "username"), followed by an "@", and ending with a domain name. However, an identifier having a valid format does not confirm that the identifier is completely free of typographical errors, for example. An error within an identifier that does not affect the validity of the identifier format may be referred to as a "non-essential typographical error".

In some cases, a checkout process may require a customer to enter an identifier twice to provide a redundancy check of the identifier. The two entries of the identifier may be compared to each other to help ensure that no errors are present in either entry. However, this method of validating an identifier also has shortcomings. For example, a customer, in an effort to save time, may type the identifier into the first entry and then copy and paste the identifier into the second entry. As such, any typographical errors in the first entry would be carried into the second entry, resulting in the checkout process believing that the incorrect identifier is accurate.

In some cases, a web browser or another software application (e.g., an e-commerce application) may store one or more of a customer's identifiers to autofill corresponding fields during a checkout process. However, this method requires the customer to be using a device and/or be signed-on to an account that has their identifiers saved. This might not always be the case. For example, a customer may be using a new device and/or might not be signed-on to any account that is capable of automatically providing their identifiers, and therefore the customer may have to manually enter their identifiers, which may result in errors. Further, an autofill function may provide an incorrect identifier. The incorrect identifier may be a saved identifier that contains a typographical error or may be an old identifier, for example. The autofill function might also provide the incorrect identifier in multiple entries, which could negate a redundancy check of the identifier.

Using conventional methods, checkout processes cannot always confirm that user-provided data (e.g., an email address) is error-free before creating an online order. Some embodiments leverage stored user data to help resolve errors in user-provided data, for example, after a checkout process is complete and an order has been created. This functionality may be used to provide improved merchant and/or customer experiences by helping to ensure that post-purchase communication between a merchant and a customer is possible even when customer-provided data includes one or more errors.

Figure 3:
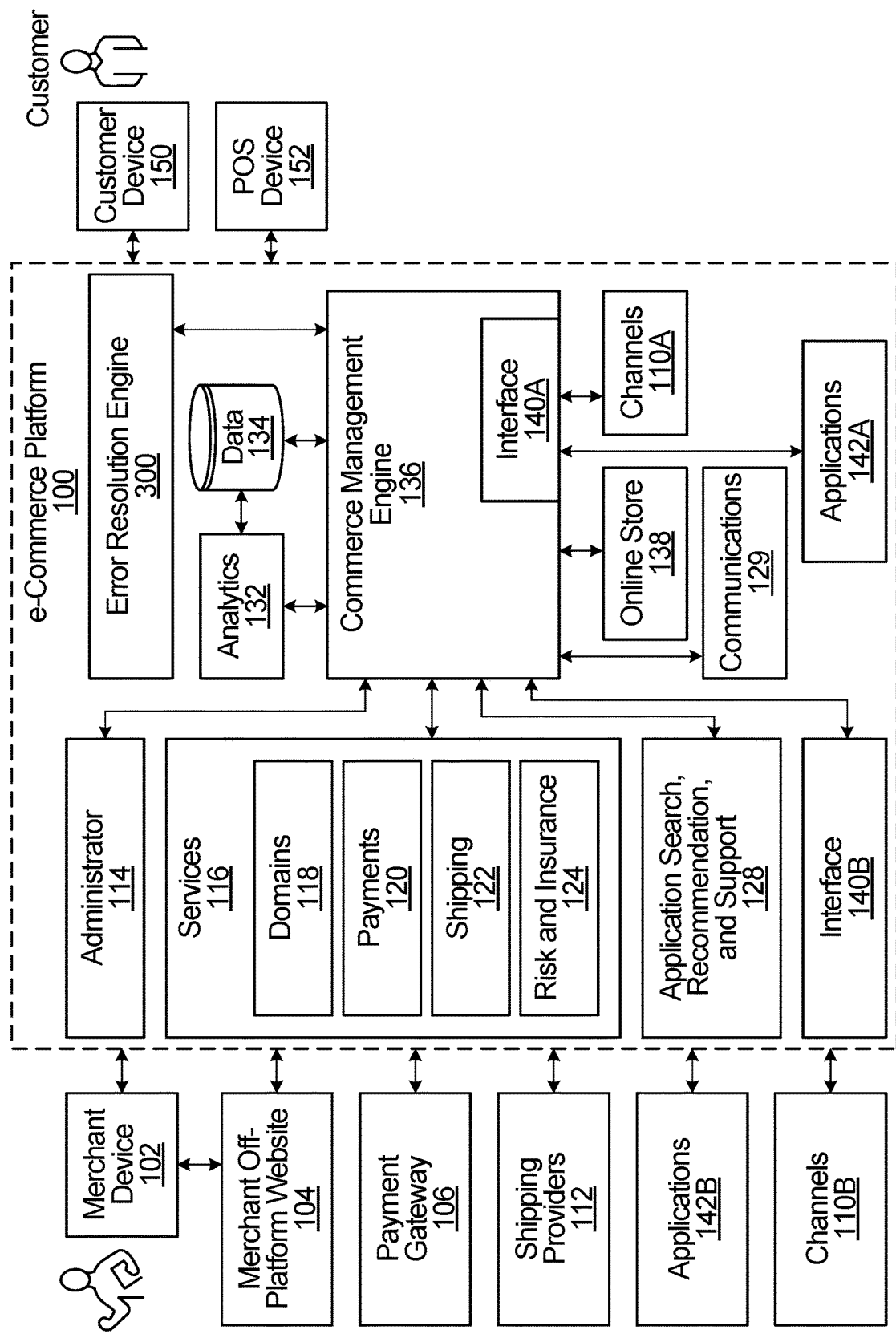
FIG. 3 illustrates the e-commerce platform of FIG. 1, but including an error resolution engine.

FIG. 3 illustrates the e-commerce platform 100 of FIG. 1, but including an error resolution engine 300. The error resolution engine 300 is an example of a computer-implemented system that may perform error resolution for user-provided data at the e-commerce platform 100, the customer device 150 and/or the merchant device 102. For example, the data 134 may store identifiers corresponding to different customer accounts on the e-commerce platform 100 and/or to previous purchases made through the e-commerce platform 100. The data 134 may include a relatively large set of known customer identifiers. The error resolution engine 300 may be used to detect an error in a customer-provided identifier before or after an online order has been created, and use the stored customer identifiers to help determine a correct identifier in order to facilitate communication with the customer, for example.

Although the error resolution engine 300 is illustrated as a distinct component of the e-commerce platform 100 in FIG. 3, this is only an example. An error resolution engine could also or instead be provided by another component residing within or external to the e-commerce platform 100. In some embodiments, either or both of the applications 142A-B provide an error resolution engine that implements the functionality described herein to make it available to customers and/or to merchants. Furthermore, in some embodiments, the commerce management engine 136 provides that error resolution engine. However, the location of the error resolution engine 300 is implementation specific. In some implementations, the error resolution engine 300 is provided at least in part by an e-commerce platform, either as a core function of the e-commerce platform or as an application or service supported by or communicating with the e-commerce platform. Alternatively, the error resolution engine 300 may be implemented as a stand-alone service to clients, such as a customer device 150 or a merchant device 102. In addition, at least a portion of such an error resolution engine could be implemented in the merchant device 102 and/or in the customer device 150. For example, the customer device 150 could store and run an error resolution engine locally as a software application.

As discussed in further detail below, the error resolution engine 300 could implement at least some of the functionality described herein. Although the embodiments described below may be implemented in association with an e-commerce platform, such as (but not limited to) the e-commerce platform 100, the embodiments described below are not limited to e-commerce platforms.

Example Systems and Methods for Resolving Errors in User-Provided Data

Figure 4:
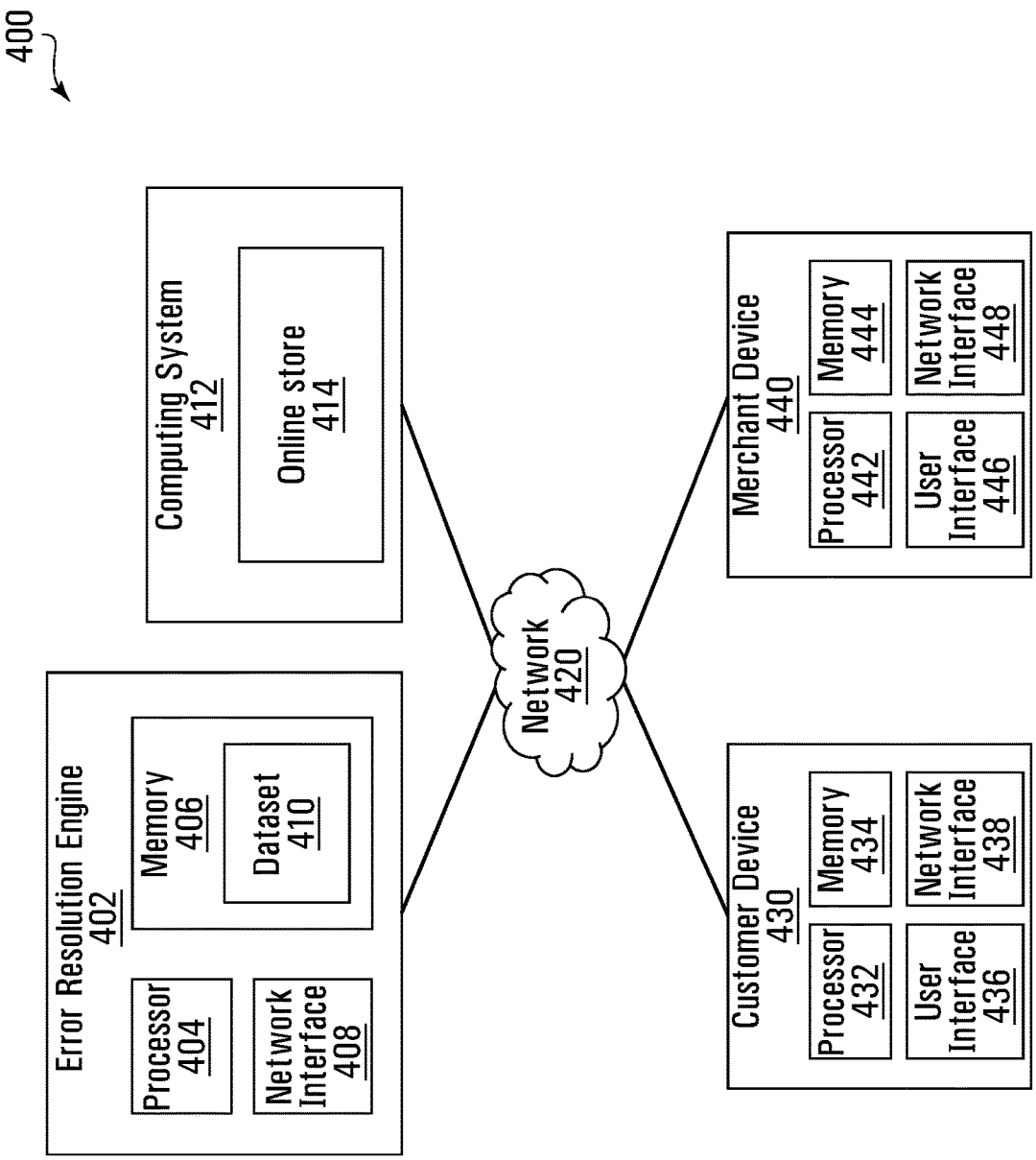
FIG. 4 is a block diagram illustrating a system for resolving errors in user-provided data, according to an embodiment.

FIG. 4 is a block diagram illustrating a system 400 for resolving errors in user-provided data, according to an embodiment. The system 400 includes an error resolution engine 402, a computing system 412, a network 420, a customer device 430 and a merchant device 440.

The computing system 412 supports, hosts or otherwise implements an online store 414. The online store 414 may offer products for sale, perform checkout processes, generate online orders, and/or perform other functions related to e-commerce. For example, the customer device 430 may access the online store 414 to view a product, complete a checkout process, and place an order for the product. In some implementations, the online store 414 is owned and/or operated by a merchant associated with the merchant device 440. For example, the merchant device 440 may be used to manage the online store 414.

The structure of the computing system 412 is implementation specific. The computing system 412 may include or implement a processor, memory, server, client, network interface, network infrastructure, mobile computing platform, cloud computing platform and/or stationary computing platform, for example. Optionally, the computing system 412 is, or is part of, an e-commerce platform. For example, the computing system 412 may be similar to the e-commerce platform 100, and the online store 414 may be similar to the online store 138.

The customer device 430 is an example of a user device. The customer device 430 may be, for example, a mobile phone, tablet, laptop, smart watch, television, POS device or computer owned and/or used by a customer. The customer device 430 includes a processor 432, memory 434, user interface 436 and network interface 438. An example of a user interface is a display screen (which may be a touch screen), a gesture recognition system, a keyboard, and/or a mouse. The network interface 438 is provided for communicating over the network 420. The structure of the network interface 438 will depend on how the customer device 430 interfaces with the network 420. For example, if the customer device 430 is a mobile phone or tablet, then the network interface 438 may include a transmitter/receiver with an antenna to send and receive wireless transmissions to/from the network 420. If the merchant device is a personal computer connected to the network with a network cable, the network interface 438 may include, for example, a network interface card (NIC), a computer port (e.g., a physical outlet to which a plug or cable connects), and/or a network socket. The processor 432 directly performs or instructs all of the operations performed by the customer device 430. Examples of these operations include processing user inputs received from the user interface 436, preparing information for transmission over the network 420, processing data received over the network 420, and instructing a display screen to display information. The processor 432 may be implemented by one or more processors that execute instructions stored in the memory 434. Alternatively, some or all of the processor 432 may be implemented using dedicated circuitry, such as an application specific integrated circuit (ASIC), a graphics processing unit (GPU) or a programmed field programmable gate array (FPGA).

The merchant device 440 is another example of a user device. The merchant device 440 may be a mobile phone, tablet, laptop, or computer owned and/or used by a merchant. The merchant device 440 includes a processor 442, memory 444, user interface 446 and network interface 448. Example implementations of processors, memory, user interfaces and network interfaces are provided above with regard to the processor 432, the memory 434, the user interface 436 and the network interface 438.

In FIG. 4, one customer device and one merchant device are shown by way of example. In general, more than one customer device and/or merchant device may be implemented in the system 400.

The network 420 may be a computer network implementing wired and/or wireless connections between different devices, including any two or more of the error resolution engine 402, the computing system 412, the customer device 430 and the merchant device 440, for example. The network 420 may implement any communication protocol known in the art. Non-limiting examples of communication protocols include a local area network (LAN), a wireless LAN, an internet protocol (IP) network, and a cellular network.

The error resolution engine 402 is configured to resolve errors in received data, such as data provided by the customer device 430, for example. This may include, but is not limited to, resolving errors in identifiers provided during checkout processes implemented by the online store 414. For example, using the customer device 430, a customer may initiate a checkout process in the online store 414 and provide an identifier (e.g., an email address) to complete the checkout process and create an online order. The error resolution engine 402 may be used to analyse the identifier, detect any errors in the identifier, and/or resolve those errors. Example methods for detecting and resolving such errors are provided elsewhere herein.

The error resolution engine 402 includes a processor 404, memory 406, and a network interface 408. The processor 404 may be implemented by one or more processors that execute instructions stored in the memory 406 or in another non-transitory computer readable medium. These instructions could implement any method described herein. Alternatively, some or all of the processor 404 may be implemented using dedicated circuitry, such as an ASIC, a GPU, or a programmed FPGA.

The network interface 408 is provided for communication over the network 420. The structure of the network interface 408 is implementation specific. For example, the network interface 408 may include a NIC, a computer port, and/or a network socket.

As illustrated, the memory 406 stores a dataset 410. The dataset 410 includes a set of user data pertaining to multiple users and/or to multiple user accounts. At least some of the data in the dataset 410 may pertain to customers of the online store 414. For example, some users may have an account on the online store 414 and/or may have previously placed an order through the online store 414. Data pertaining to these users may be obtained when the users create accounts and/or place orders on the online store 414, which may then be stored in the dataset 410. However, the dataset 410 is not limited to customers of the online store 414. The dataset 410 may also or instead pertain to customers of one or more other online stores and/or may pertain to the customers of an e-commerce platform. For example, the dataset 410 may be similar to the data 134 of the e-commerce platform 100. The dataset 410 is also not limited to users of commerce-based platforms, and might also or instead include data pertaining to users of other computing systems, such as social media platforms, for example.

In some implementations, the user data in the dataset 410 may be organized by user, such that data pertaining to each user is consolidated. Alternatively or additionally, the user data in the dataset 410 may be organized by user accounts, such that the data pertaining to each user account is consolidated.

The dataset 410 may include one or more identifiers for a user and/or for their associated user account. For a given user and/or user account, the following is a non-limiting list of different types of identifiers that may be included in the dataset 410.

A name and/or identification number of the user.

A username and/or moniker of the user account.

One or more communication handles associated with the user or user account, including email addresses, phone numbers and/or social media identifiers (e.g., social media usernames), for example.

One or more locations associated with the user or user account. These locations may include one or more postal addresses such as a home address, a work address, a shipping address and/or a billing address, for example. The locations may also or instead include, or be based on, location data. Location data may include satellite data, such as global positioning system (GPS) coordinates, for example.

One or more IP addresses obtained from a device (or devices) associated with the user or user account.

Payment information associated with the user or user account, including but not limited to previously used payment methods, credit/debit card information, and bank account information, for example.

As illustrated in FIG. 4, the error resolution engine 402 and the computing system 412 are separate. However, in some implementations, the error resolution engine 402 and the computing system 412 may be at least partially combined. For example, the computing system 412 may implement the error resolution engine 402 and the online store 414. Other implementations of an error resolution engine are also contemplated. In some implementations, an error resolution engine is provided at least in part by an e-commerce platform, either as a core function of the e-commerce platform or as an application or service supported by or communicating with the e-commerce platform. The online store 414 may also be provided by this e-commerce platform. While the error resolution engine 402 is shown as a single component, an error resolution engine could instead be provided by multiple different components that are in communication via a network.

Figure 5:
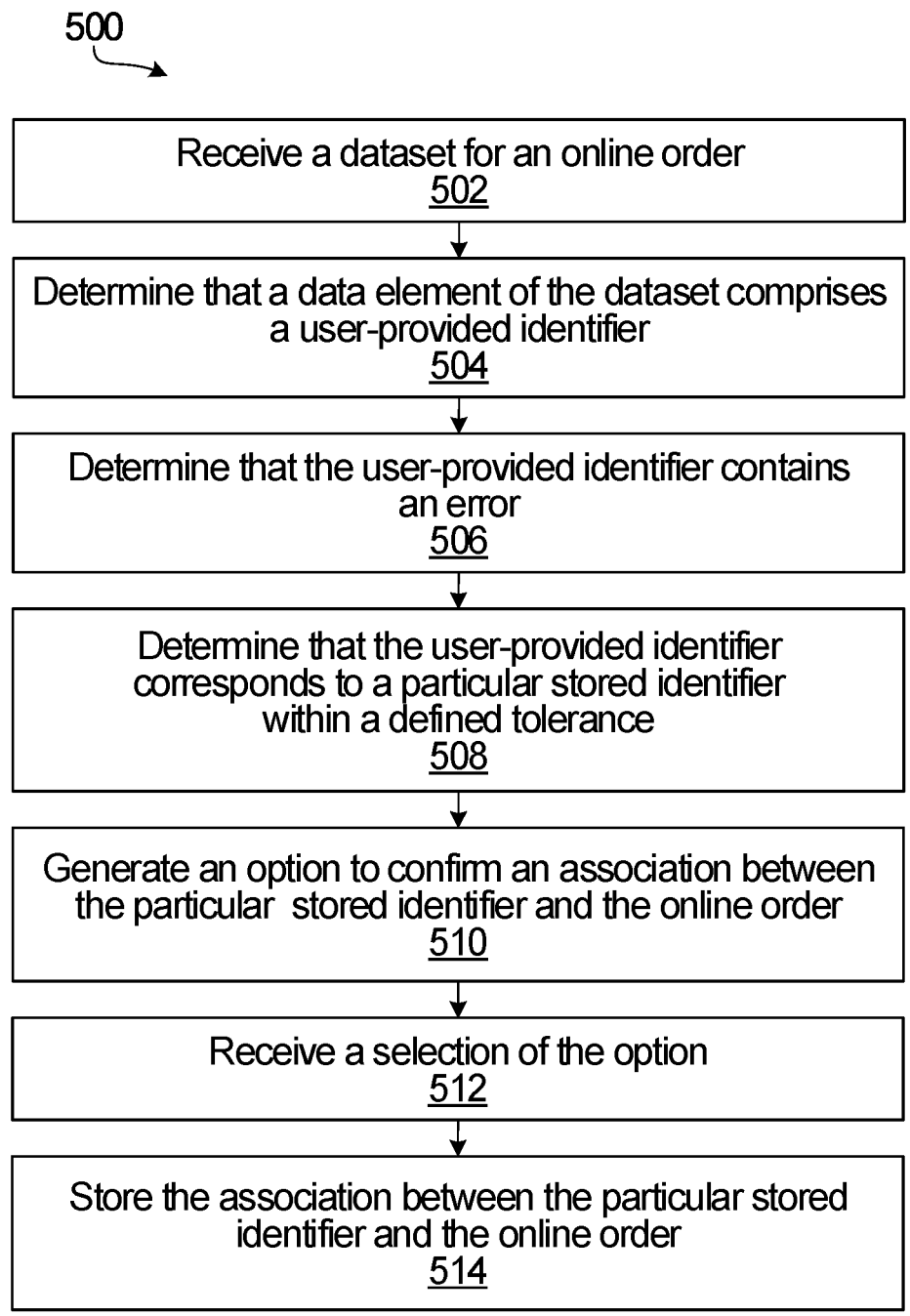
FIG. 5 is a flow diagram illustrating a method for resolving an error in a user-provided dataset for an online order, according to an embodiment.

FIG. 5 is a flow diagram illustrating a method 500 for resolving an error in a user-provided dataset for an online order, according to an embodiment. The method 500 will be described as being performed by the error resolution engine 402 of FIG. 4. For example, the memory 406 may store instructions which, when executed by the processor 404, cause the processor 404 to perform the method 500. However, other implementations of the method 500 are also contemplated. In general, the method 500 is not limited to an error resolution engine, and may instead be performed in whole or in part by a merchant device and/or an e-commerce platform, for example.

Step 502 includes the processor 404 receiving the user-provided dataset for the online order. In some implementations, the online order is generated by the computing system 412 and/or the online store 414 following a checkout process performed by a user (e.g., by a customer using the customer device 430). However, the user-provided dataset may be received in step 502 before the online order is actually generated. For example, the user-provided dataset may be received while a user is performing a checkout process, but before the checkout process is completed. If the error resolution engine 402 and the computing system 412 are implemented separately, then the user-provided dataset may be transmitted to the error resolution engine 402 via the network 420. Alternatively, if the error resolution engine 402 and the computing system 412 are implemented in combination, then the user-provided dataset may be obtained by the error resolution engine 402 from shared memory.

The user-provided dataset for the online order may include any, some or all of the user data that is provided by the user during the checkout process in the online store 414. Non-limiting examples of such user data include the user's name, an email address, a telephone number, a personal identification number, a username, a social media identifier, a postal address and/or payment information. Some data in the user-provided dataset might not have been manually entered by a user, but nonetheless may be provided when the user performs the checkout process. An example of such information is an IP address of a device (e.g., the customer device 430) used by the user to perform the checkout process.

The user that placed the online order may be a returning customer of the online store 414 and/or may have an account on the online store 414. Alternatively or additionally, the user may be a returning customer of and/or may have an account on an e-commerce platform that supports the online store 414. However, even if the user is a returning customer, the online store 414 might not know the identity of the user during the checkout process. For example, the user might be using a new device and/or might not be signed-on to their account on the online store 414 during the checkout process, and therefore the online store 414 might not be able to determine the identity of the user before the online order is created.

Step 504 includes the processor 404 determining that a data element of the user-provided dataset includes a user-provided identifier. For example, the checkout process may include an email address entry field which, when filled in by the user, adds the user-provided email address to a particular data element in the user-provided dataset. The processor 404 may then interpret any information in this particular data element as the user-provided email address. Alternatively or additionally, the processor 404 might parse the user-provided dataset to locate any data elements that include information having the format of an email address, examples of which are provided above. The processor 404 may also or instead determine that the user-provided dataset includes a personal identification number and/or a telephone number.

Step 506 includes the processor 404 determining that the user-provided identifier contains an error. An example of such an error is a typographical error made when the user enters their identifier during the checkout process. The detection of an error in the user-provided identifier may be considered a failed verification of the identifier. The error may be detected before or after a checkout process is complete and the online order has been created.

The error in the user-provided identifier may be detected in any of a number of different ways. In some implementations, the error in the user-provided identifier is detected after a failed attempt to communicate with the user via the identifier. For example, step 506 may include transmitting a message to a user-provided email address or at least attempting to transmit a message to the email address. This message could be an order confirmation message that is sent in part to validate the user-provided email address, but other types of messages are also contemplated. For example, the message may include shipping information. The message may be sent by the merchant of the online store 414 using the error resolution engine 402, the merchant device 440 and/or the computing system 412, for example. In another example, step 506 may include transmitting a message to a user-provided telephone number (e.g., transmitting an SMS message to the telephone number).

Step 506 may further include receiving, in response to transmitting the message, an indication that the user-provided identifier contains the error. For example, this indication may be a delivery failure notification for the message or another type of notification that indicates the user-provided identifier is not active and contains the error. Alternatively, the error in the user-provided identifier may result in an incorrect but active identifier that is in use by another person. In this case, the indication that the user-provided identifier contains the error may be a reply to the message from this other person indicating that they did not create the online order and that the user-provided identifier contains the error. In some implementations, the message sent to the user-provided identifier may include a link that the other person may select to indicate that they did not create the online order.

The error in the user-provided identifier may also or instead be determined based on an analysis of the identifier. For example, step 506 may include analysing the user-provided identifier before or after the online order is created to determine if the user-provided identifier has a valid format. An invalid identifier format may indicate an error in the user-provided identifier.

Examples of valid email address formats are provided above. In some implementations, the domain of a user-provided email address may be analyzed in step 506 to determine if it is an active email domain. The analysis of the domain may identify common errors in user-provided email addresses. For example, the incorrect domain "gmial.com" may be a common typographical error made by users that intend to enter "gmail.com".

Step 508 includes the processor 404 determining that the user-provided identifier corresponds to a stored identifier within a defined tolerance. This stored identifier may be stored in the dataset 410 or in another dataset that is accessible by the error detection engine 402. In some implementations, step 508 may include a comparison between the user-provided identifier and a set of multiple stored identifiers in the dataset 410. The user-provided identifier may be compared to any, one, some or all of the multiple stored identifiers. Based on this comparison, the error resolution engine 402 may determine that a particular stored identifier matches the user-provided identifier within the defined tolerance. For example, the similarities between the particular stored identifier and the user-provided identifier may meet or exceed a defined threshold. In this way, the particular stored identifier may be identified as a potential identifier for the user that placed the online order.

The multiple stored identifiers in the dataset 410 could correspond to different users of the online store 414 and/or to different users of an e-commerce platform. The multiple stored identifiers may also or instead correspond to users of other software services, such as social media platforms, for example. In some implementations, step 508 may determine that the user-provided identifier matches more than one stored identifier in the dataset 410 within the defined tolerance.

Step 508 may be considered "approximate string matching" or "proximity matching" the user-provided identifier with a stored identifier. For example, determining that the user-provided identifier corresponds to the stored identifier within the defined tolerance may indicate that the stored identifier is similar or close to the user-provided identifier. In other words, the error resolution engine 402 might not look for an exact match between the user-provided identifier and the stored identifier. Rather, the error resolution engine 402 may search for a close but imperfect match that allows for the known error in the user-provided identifier using the defined tolerance.

The defined tolerance may be expressed in terms of an edit distance, which is a metric for the difference between two strings of characters. In some implementations, an edit distance between the user-provided identifier and a stored identifier may be calculated by determining the number of single-character edits needed to transform the user-provided identifier into the stored identifier. Examples of different types of edit distances include a Levenshtein distance and a Damerau-Levenshtein distance. A Levenshtein distance may include the number of single-character insertions, deletions and/or substitutions needed to transform the user-provided identifier into the stored identifier. A Damerau-Levenshtein distance may include the number of single-character insertions, deletions and/or substitutions, and may also include the number of adjacent-character transpositions (e.g., switching the positions of two adjacent characters).

In some implementations, step 508 includes calculating an edit distance between the user-provided identifier and the stored identifier, and determining that the edit distance is within the defined tolerance. When calculating an edit distance such as a Levenshtein distance or a Damerau-Levenshtein distance, for example, each type of single-character edit may be assigned a particular value. The edit distance between the user-provided identifier and a stored identifier may be defined as the lowest summed value of single-character edits that can transform the user-provided identifier into the stored identifier. According to one example, single-character insertions and deletions may each be assigned a value of 1, and single-character substitutions and transpositions may each be assigned a value of 1.5. An edit distance may then be defined as, ED=min [1*(I+D)+ 1.5*(S+T)], where ED is the edit distance, I is the number of single-character insertions, D is the number of single-character deletions, S is the number of single-character substitutions, and T is the number of single-character transpositions.

According to another example, if each single-character insertion, deletion, substitution and transposition is assigned a value of 1, then an edit distance equal to 1 may be calculated based on the email address "example@sample.com" and each of the following email addresses:

"examle@sample.com" (e.g., insertion of "p");
"exxample@sample.com" (e.g., deletion of "x");
"exmaple@sample.com" (e.g., transposition of "m" and "a"); and
"ezample@sample.com" (e.g., substitution of "z" for "x").

Further examples of determining edit distances may be found in Boytsov, Leonid (2011), Indexing methods for approximate dictionary searching: Comparative analysis, ACM Journal of Experimental Algorithmics 16, 10.1145/1963190.1963191, the entire contents of which are incorporated by reference herein.

In some implementations, multiple different tolerances may be used to locate a stored identifier that corresponds to the user-provided identifier. For example, a first comparison could be performed using a low tolerance (e.g., an edit distance of 1) to locate any stored identifiers with a close correspondence to the user-provided identifier. If the first comparison fails to identify any corresponding stored identifiers, then further comparisons using progressively larger tolerances (e.g., an edit distance of 2 or more) may be performed.

In some implementations, other user information that is included in the user-provided dataset for the online order may be used to help reduce the number of stored identifiers that are compared to the user-provided identifier. For example, the user-provided dataset may include a second user-provided identifier other than the first user-provided identifier that contains the error. Examples of the second user-provided identifier include a postal address (e.g., a shipping address and/or billing address), payment information (e.g., credit and/or debit card details) and/or an IP address obtained from the checkout process. The second user-provided identifier might not include an error. Step 508 may then include comparing the second user-provided identifier to multiple stored identifiers in the dataset 410 and/or in another dataset that is accessible by the error resolution engine 402. Based on this comparison, the error resolution engine 402 may determine that the second user-provided identifier matches a particular stored identifier. It should be noted that this match might not be an exact match, and might instead be a substantial match or a match within a defined tolerance. Step 508 may then include determining that the particular stored identifier is associated with a further stored identifier, where the further stored identifier is the same type of identifier as the first user-provided identifier (e.g., the further stored identifier and the first user-provided identifier are both email addresses). The error resolution engine 402 could then determine if this further stored identifier corresponds to the first user-provided identifier within the defined tolerance, as outlined above.

In some implementations, the error resolution engine 402 may determine that the second user-provided identifier corresponds to multiple stored identifiers in the dataset 410, which in turn are associated with multiple other stored identifiers in the dataset 410 being the same type of identifier as the first user-provided identifier. Step 508 could then include comparing each of these other stored identifiers to the first user-provided identifier. Stored identifiers in the dataset 410 that are not associated with the second user-provided identifier might not be compared to the first user-provided identifier. This might help reduce the processing demands of the method 500, as determining if stored identifiers correspond to the first user-provided identifier within the defined tolerance by calculating edit distances, for example, could be relatively computationally intensive. However, determining if stored identifiers match the second user-provided identifier (which might not include any errors) could be less computationally intensive, as edit distances might not be calculated. Therefore, using the second user-provided identifier to reduce the number of stored identifiers that are considered in step 508 might reduce the computational demands on the error resolution engine 402.

By way of example, a shipping address included in the user-provided dataset for the online order may match or may substantially match the shipping address used by four different user accounts stored in the dataset 410. For example, four different residents of this address may each have their own account on the online store 414. If the first user-provided identifier is a user-provided email address, then the stored email addresses for each of these accounts could then be compared to the user-provided email address. If any of the stored email addresses correspond to the user-provided email address within the defined tolerance, then that stored email address may be considered to match the online order.

Other methods may also or instead be implemented to reduce the number of stored identifiers that are compared to the first user-provided identifier in step 508. For example, any stored identifiers that differ in character length (i.e., in the total number of characters) from the first user-provided identifier by more than a defined limit may be disregarded in step 508. This defined limit may be a difference of 2, 3, 4 or 5 characters, for example.

Step 508 may be performed before determining that there is an error in the first user-provided identifier. In this way, steps 506, 508 may be performed in combination. For example, step 508 may include detecting the error in the first user-provided identifier based on other information in the user-provided dataset. For example, a name, a postal address, an IP address and/or payment information provided by the user may match data pertaining to a particular user and/or user account stored in the dataset 410. However, a user-provided email address may differ from the stored email address for that user or user account. The error-resolution engine 402 may infer that the user had intended to enter the stored email address, and therefore infer that the user-provided email address may contain an error. This comparison of the user-provided email address to the dataset 410 could allow the error resolution engine 402 to detect errors in the user-provided email address that still produce an active email address in use by another individual, for example.

A correspondence between the user-provided identifier containing the error and a stored identifier within a defined tolerance might not be sufficient to establish that the user associated with the stored identifier actually created the online order. As such, after determining that the user-provided identifier corresponds to a stored identifier, a user associated with the stored identifier may be provided with an option to claim the online order.

Step 510 includes the processor 404 generating an option for a user associated with the stored identifier to confirm an association between the stored identifier and the online order. The option could be presented to the user in any of a variety of different ways. In some implementations, the option is included in a message that is sent to a stored email address corresponding to the stored identifier. For example, the option could be a hyperlink embedded in the message that directs the user to a webpage to confirm the association between the stored identifier and the online order. Alternatively or additionally, if the stored identifier corresponds to a user account on the online store 414 or on an e-commerce platform, then the option could be presented to the user via that user account. For example, step 510 may include generating the option for presentation on a screen page of the user account. Further, the option may be provided during a checkout process before the online order is created. For example, the option may be displayed on a screen page of the checkout process. The user may select the option to confirm that the stored identifier should be linked to the online order that is in the process of being created.

In the case that more than one stored identifier is determined to correspond to the user-provided identifier in step 508 after the online order is created, then step 510 may include generating an option for each of the users associated with the stored identifiers to claim the online order. For example, each option may enable a user to confirm an association between the respective stored identifier and the online order.

Step 512 includes the processor 404 receiving, from a user device associated with the user, a selection of the option to confirm the association between the stored identifier and the online order. For example, the selection of the option could be received from the customer device 430 after the online order is created. Upon selection of the option, the user may be asked questions to confirm that they did create the online order. These questions may relate to the product purchased through the online order, for example.

Step 514 includes storing the association between the stored identifier and the online order in response to receiving the selection of the option in step 512. The association between the stored identifier and the online order may be stored in the memory 406 (e.g., in the dataset 410) and/or in memory of the computing system 412. For example, after confirming that the user associated with the stored identifier was the creator of the online order, the stored identifier may be linked to the online order to enable communication between the user and the merchant of the online store 414. The user may receive messages related to the order from the merchant, including an order confirmation message and/or messages related to order fulfillment (e.g., shipping updates), for example. The user may also or instead communicate with the merchant to modify, cancel and/or return the online order. In this way, the method 500 may resolve the error in the user-provided identifier.

In some implementations, if the stored identifier corresponds to a user account associated with the user, then step 514 may include associating the online order with the user account. For example, the order may be merged with the user's account on the online store 414 and/or on an e-commerce platform. The order may be added to the user's order history on that account.

It should be noted that at least some of steps 502, 504, 506, 508, 510, 512, 514 are optional. For example, a selection of the option to confirm the association between the stored identifier and the online order might not be received from the user device in some implementations of the method 500, and therefore steps 512, 514 are optional.

Further Examples of Resolving Errors in User-Provided Data

FIGS. 6 to 12 provide an example of the method 500 being performed by an e-commerce platform. For example, the method 500 may be performed by the e-commerce platform 100 shown in FIGS. 1 and 3, optionally using the error resolution engine 300.

Figure 6:
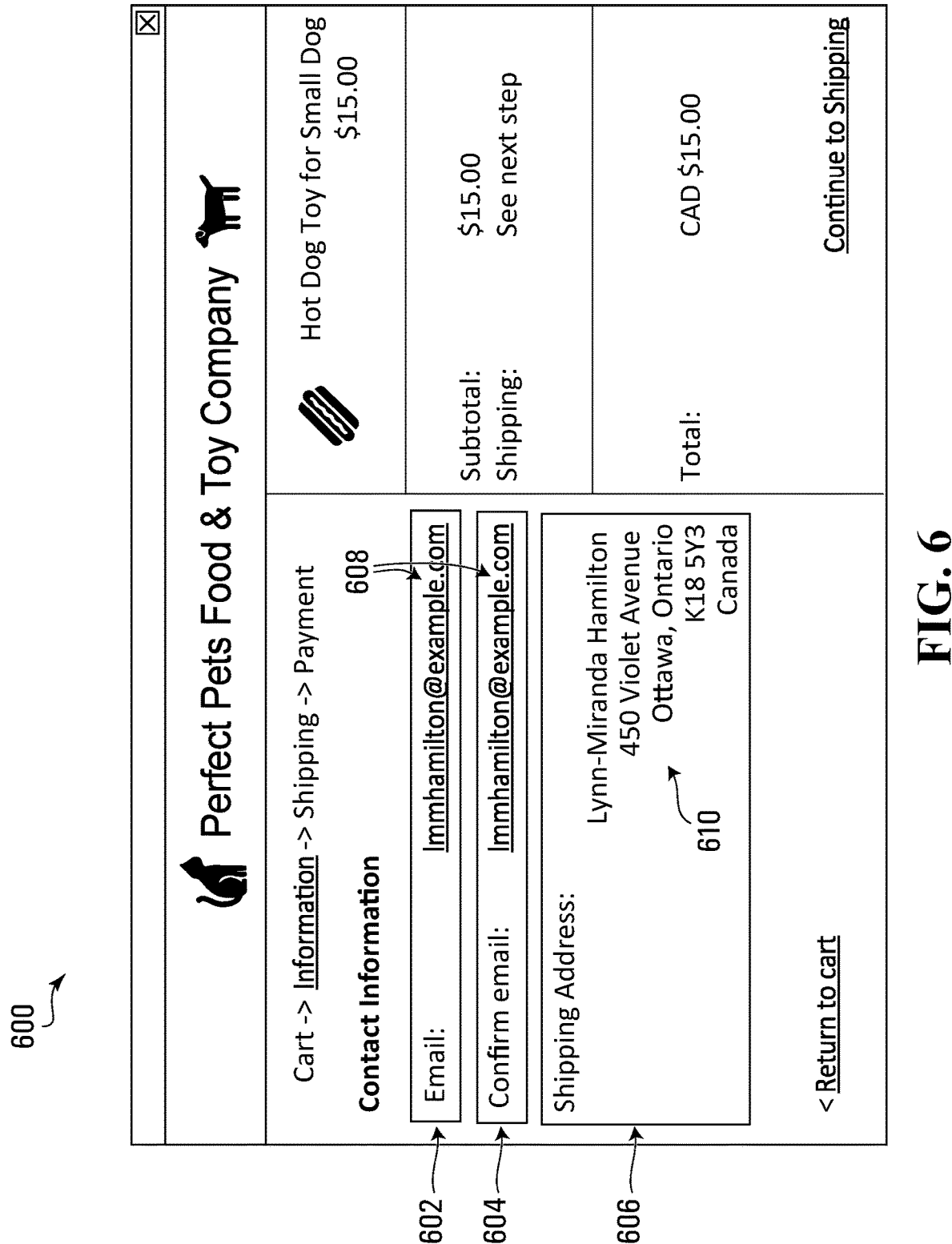
FIG. 6 illustrates a screen page for a checkout process in an online store, according to an embodiment.

FIG. 6 illustrates a screen page 600 for a checkout process in an online store that is supported by the e-commerce platform. The screen page 600 may be presented on a customer device via a web browser (e.g., be presented as a webpage) or via a software application provided by the online store and/or the e-commerce platform, for example. In the illustrated example, the merchant of the online store is the "Perfect Pets Food & Toy Company" and the checkout process is for the purchase of a "Hot Dog Toy for Small Dog". The screen page 600 includes multiple fields for the customer to provide personal data, including a field 602 to enter their email address, a field 604 to confirm their email address, and a field 606 to enter their shipping address. The fields 602, 604 include a user-provided email address 608, and the field 606 includes a user-provided shipping address 610. After the checkout process is complete, the email address 608 and the shipping address 610 may form at least part of a user-provided dataset for an online order. This user-provided dataset may be received by the e-commerce platform in step 502 of the method 500, and the e-commerce platform may determine that the user-provided dataset includes the email address 608 (i.e., an identifier) in step 504.

The email address 608 includes an error in the form of an additional "m". The correct email address of the customer is "lmhamilton@example.com", but the customer inadvertently provided the incorrect email address "lmmhamilton@example.com". This error may be a typographical error that could have been carried into both fields 602, 604 in any of a variety of different ways. In one example, the customer may have mis-remembered their email address and typed the email address 608 into both fields 602, 604 by mistake. In another example, the customer may have typed the email address 608 into the field 602 and then copied and pasted the email address 608 into the field 604. In a further example, an autofill function running on the customer device could have obtained the email address 608 from a database and provided the email address 608 in both fields 602, 604.

Figure 7:
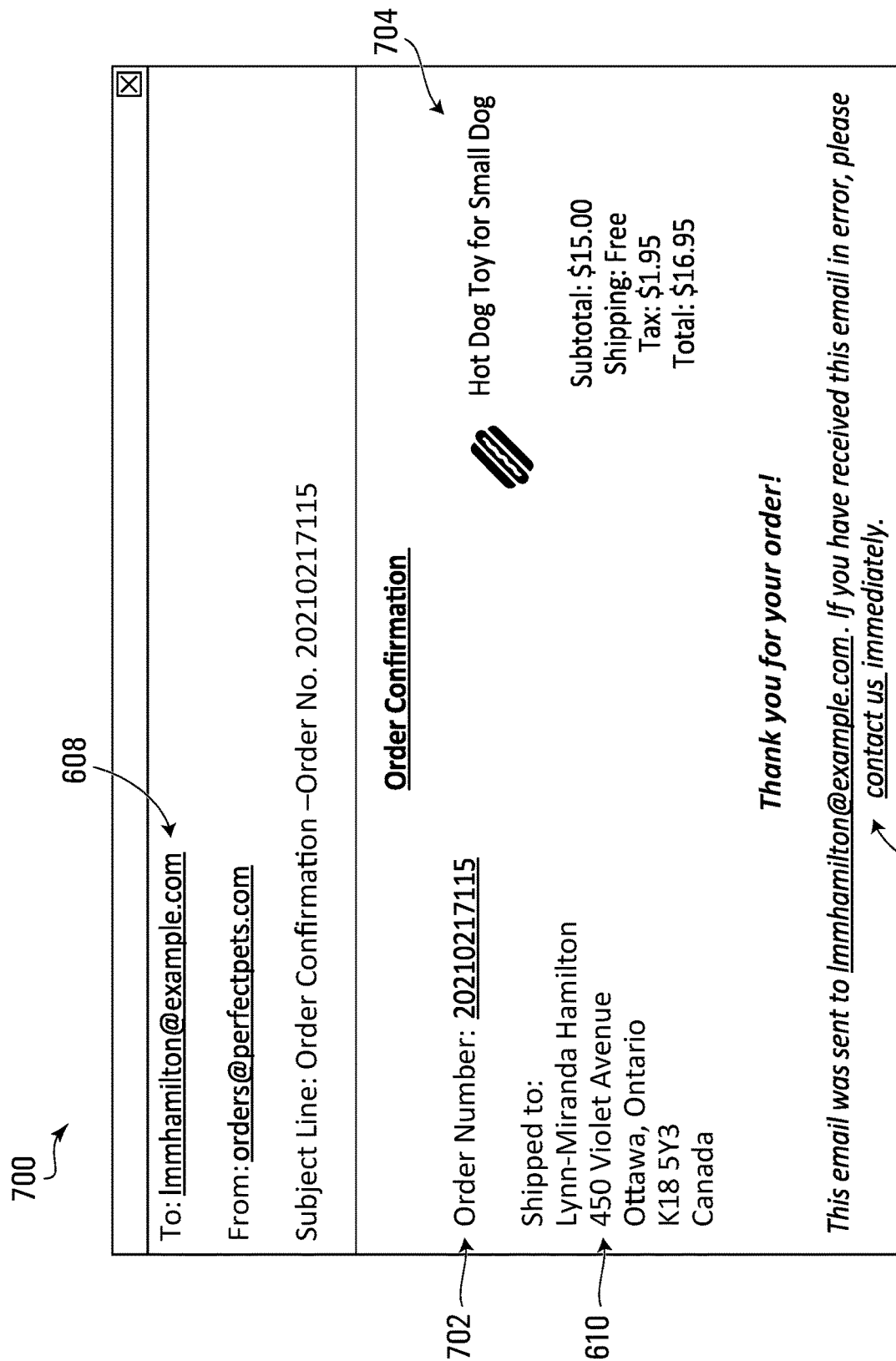
FIG. 7 illustrates an email message that is sent to a user-provided email address on behalf of a merchant of the online store of FIG. 6.
Figure 8:
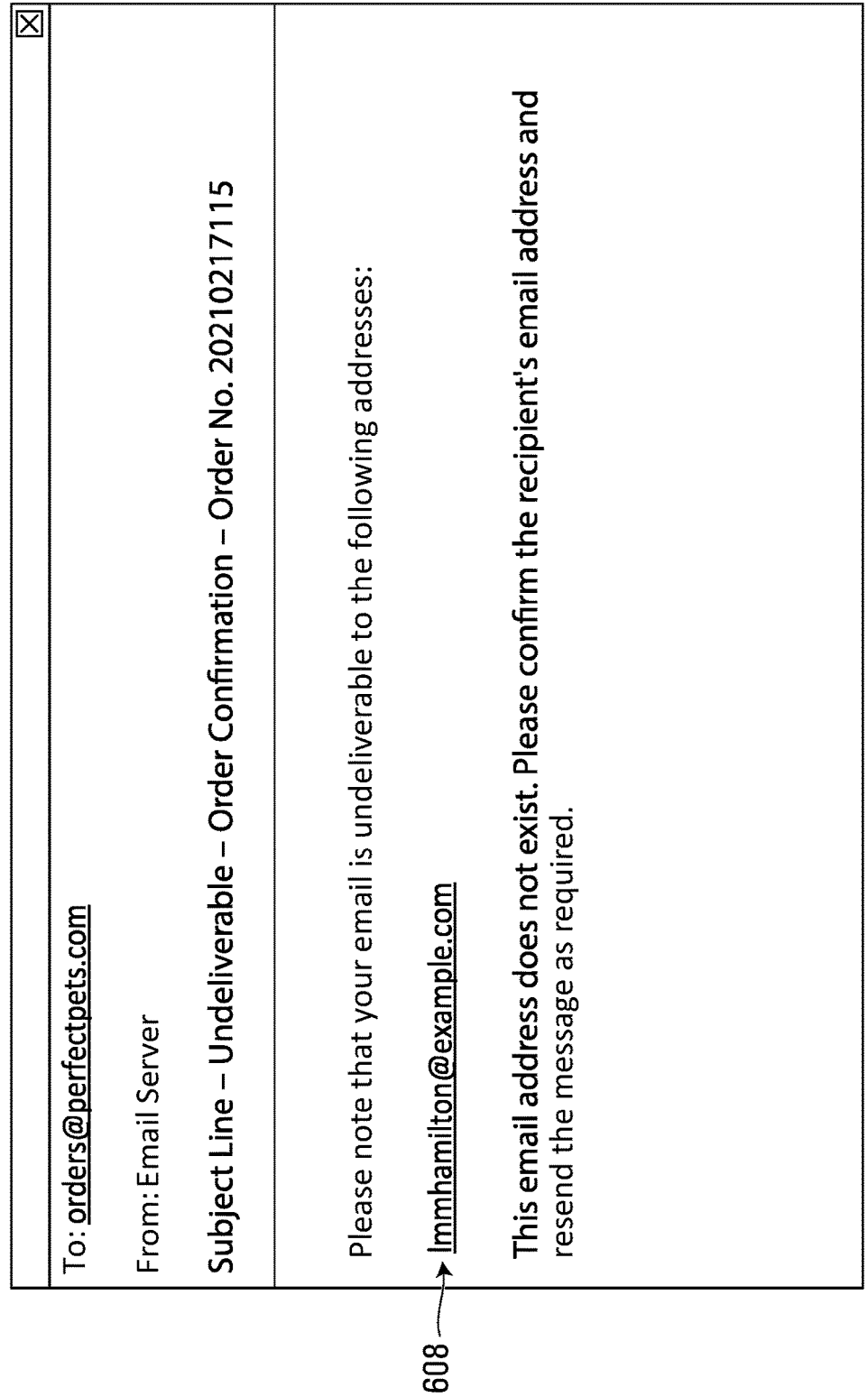
FIG. 8 illustrates an email message that provides an example of a delivery failure notification for the email message of FIG. 7.

FIGS. 7 and 8 provide an example implementation of step 506 of the method 500, in which the e-commerce platform determines the error in the email address 608. FIG. 7 illustrates an email message 700 that is sent to the email address 608 on behalf of the merchant of the online store. The email message 700 is an order confirmation message that includes, inter alia, the shipping address 610, an order number 702, an indication 704 of the product purchased and an option 706 to indicate that the email message 700 was sent to the wrong email address. If the email address 608 is a valid email address in use by another person, then this person may receive the email message 700 and select the option 708, which generates an indication that the email address 608 contains an error. This indication may be transmitted to the merchant of the online store and/or to the e-commerce platform.

Alternatively, if the email address 608 is not in use, then the merchant of the online store and/or the e-commerce platform may receive a delivery failure notification for the email message 700. FIG. 8 illustrates an email message 800 that provides an example of a delivery failure notification for the email message 700.

FIG. 9 illustrates a dataset 900 that may be used to determine a stored email address that corresponds to the email address 608. The dataset 900 is shown as a table that includes multiple rows 902, 904, 906 and multiple columns 908, 910, 912, 914. Each of the rows 902, 904, 906 corresponds to a different customer of the online store and/or of the e-commerce platform. The columns 908, 910, 912, 912 include stored data for each of these customers. The column 908 includes the names of the customers, the column 910 includes shipping addresses of the customers, the column 912 includes email addresses 916, 918, 920 for the customers, and the column 914 includes telephone numbers for the customers. The dataset 900 may be stored by the e-commerce platform.

It should be noted that FIG. 9 may only illustrate a portion of the dataset 900. For example, the dataset 900 may include additional rows corresponding to other customers and/or include additional columns corresponding to other types of data.

In step 508 of the method 500, the e-commerce platform may use the dataset 900 to determine a stored email address that corresponds to the email address 608 within a defined tolerance. In some implementations, an edit distance between the email address 608 and each of the email addresses 916, 918, 920 is calculated. By way of example, consider the case in which the edit distance is a Damerau-Levenshtein distance where each single-character insertion, deletion, substitution and transposition is assigned a value of 1, and the defined tolerance is 2. The edit distance for the email address 916 would be 11, the edit distance for the email address 918 would be 1, and the edit distance for the email address 920 would be 5. In this case, the email address 918 would be determined to correspond to the email address 608 within the defined tolerance.

The e-commerce platform might also use another customer-provided identifier from the checkout process to reduce the number of email addresses in the dataset 900 that are compared to the email address 608. For example, the shipping address 610 might be compared to the shipping addresses in the column 910. This comparison may determine that the shipping address 610 corresponds to the customer of row 904, and therefore the email address 918 might be the only email address that is compared to the email address 608.

Figure 11:
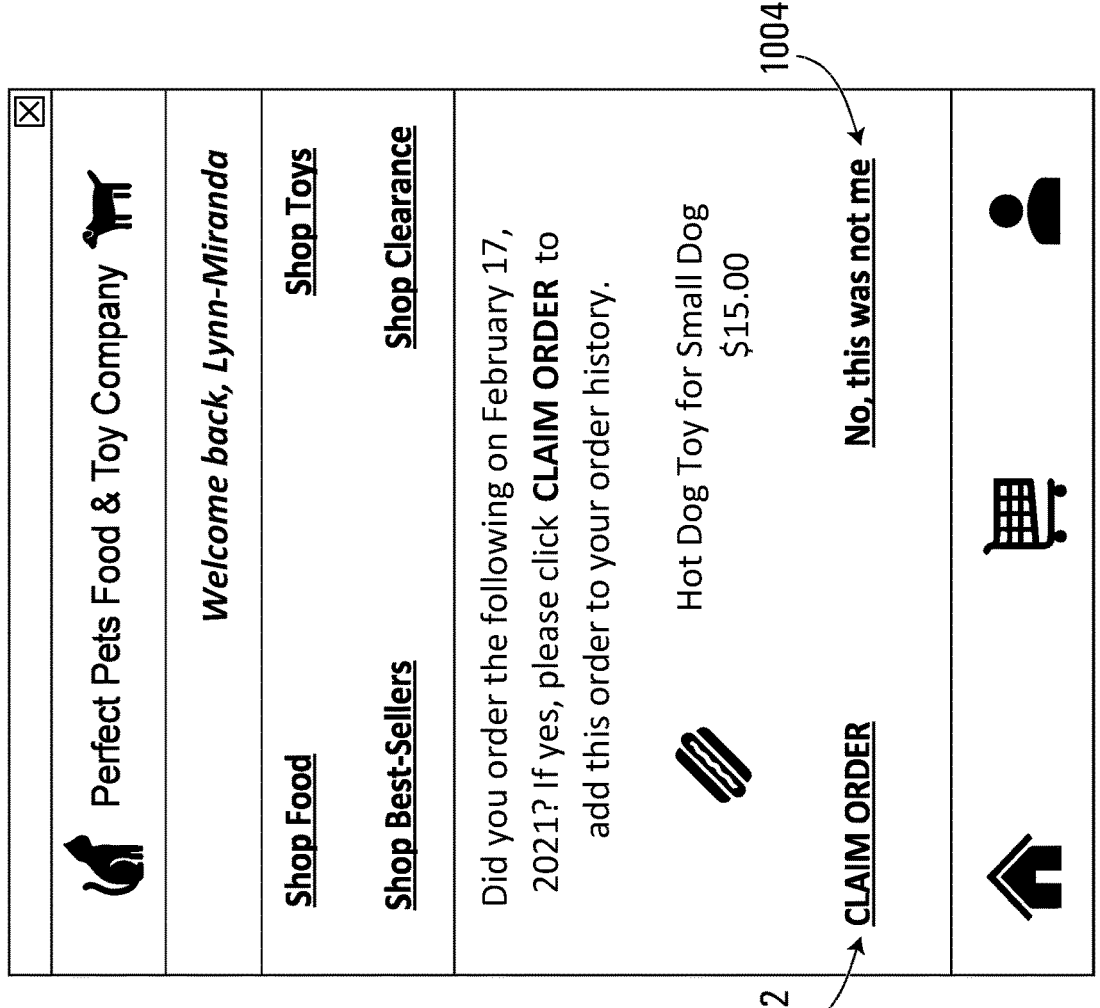
FIG. 11 illustrates a screen page accessible through a user account of the online store of FIG. 6.

FIGS. 10 and 11 illustrate example options for confirming an association between the email address 918 and the online order. These options could be generated by the e-commerce platform in step 510 of the method 500.

FIG. 10 illustrates an email message 1000 that is sent to the email address 918 on behalf of the merchant of the online store. The email message 1000 includes an option 1002 to claim the order and another option 1004 to indicate that the order was placed by another person. The options 1002, 1004 may be implemented as hyperlinks which, when selected, transmit an indication that informs the online store and/or the e-commerce platform of that selection. For example, the selection of the option 1002 could be received by the e-commerce platform in step 512 of the method 500.

FIG. 11 illustrates a screen page 1100 accessible through a user account of the online store and/or of the e-commerce platform. This user account may correspond to the customer associated with the email address 918. The user account may allow the customer to, inter alia, view and manage their online orders placed through the online store. The screen page 1100 includes the options 1002, 1004. For example, after determining that the stored email address 918 corresponds to the email address 608, the e-commerce platform may determine that the email address 918 is associated with a user account on the e-commerce platform. The e-commerce platform may then present the options 1002, 1004 to the customer via this user account.

In some implementations, upon selection of the option 1002, the user device displaying the email message 1000 and/or the screen page 1100 may be directed to another screen page generated by the e-commerce platform that includes one or more questions regarding the online order. These questions may be designed to confirm that the customer associated with the email address 918 was the customer that placed the online order. For example, the questions could ask the customer to select the shipping address 610 from a list of multiple shipping addresses. If the customer correctly selects the shipping address 610, then the e-commerce platform may confirm that the email address 918 is associated with the online order. The merchant of the online store may then communicate with the customer via the email address 918. In this way, the error in the email address 608 provided by the customer may be resolved.

Figure 12:
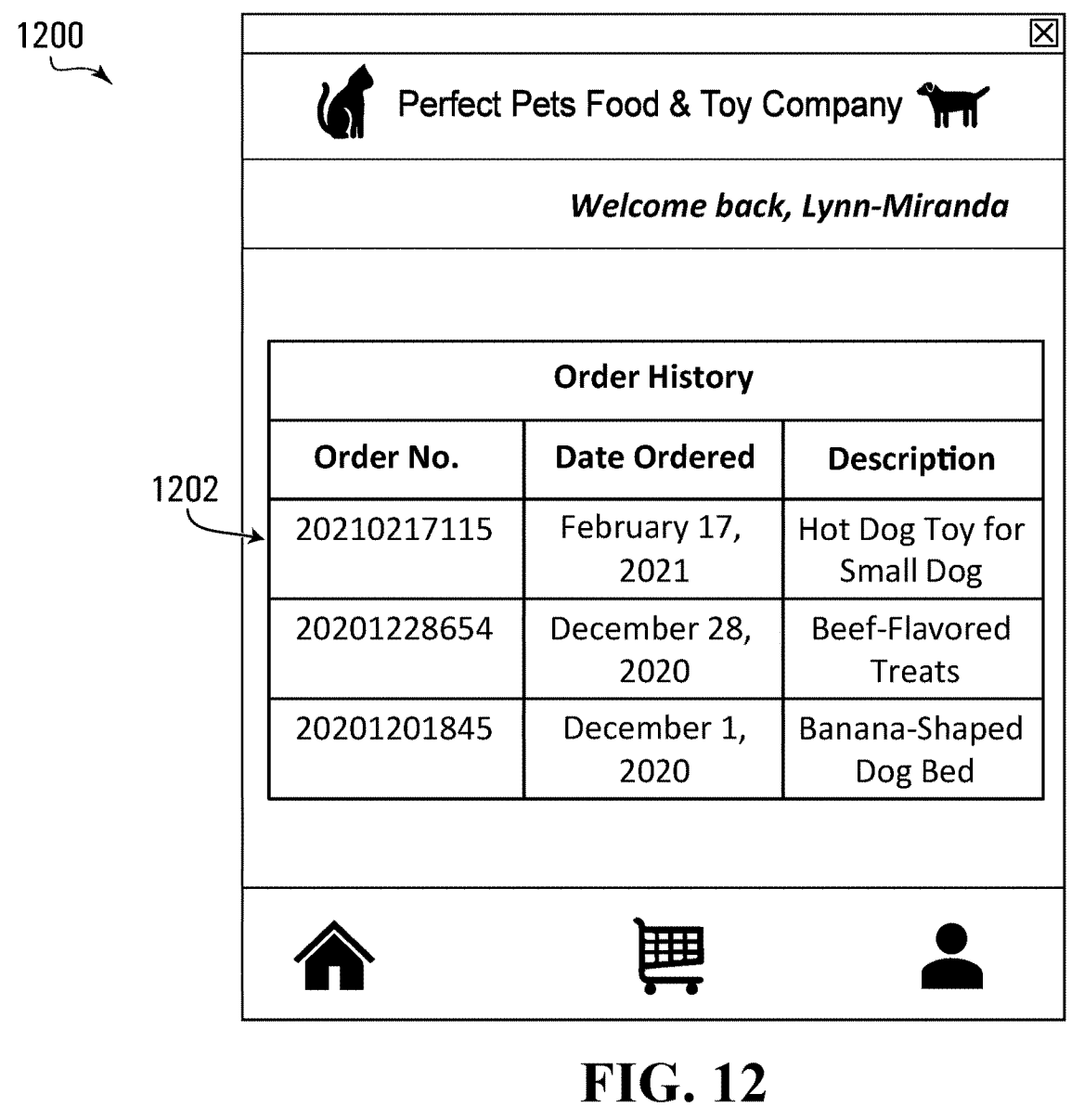

After confirming the association between the email address 918 and the online order, the e-commerce platform may store the association in step 514 of the method 500. In the case that the email address 918 is associated with the user account of the online store and/or of the e-commerce platform, then the online order may be added to a record of online orders for that user account. FIG. 12 illustrates another screen page 1200 of the user account that includes an order history for the user account. The order history includes an entry indicated at 1202 corresponding to the online order.

CONCLUSION

Although the present invention has been described with reference to specific features and embodiments thereof, various modifications and combinations can be made thereto without departing from the invention. The description and drawings are, accordingly, to be regarded simply as an illustration of some embodiments of the invention as defined by the appended claims, and are contemplated to cover any and all modifications, variations, combinations or equivalents that fall within the scope of the present invention. Therefore, although the present invention and its advantages have been described in detail, various changes, substitutions and alterations can be made herein without departing from the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

Moreover, any module, component, or device exemplified herein that executes instructions may include or otherwise have access to a non-transitory computer/processor readable storage medium or media for storage of information, such as computer/processor readable instructions, data structures, program modules, and/or other data. A non-exhaustive list of examples of non-transitory computer/processor readable storage media includes magnetic cassettes, magnetic tape, magnetic disk storage or other magnetic storage devices, optical disks such as compact disc read-only memory (CD-ROM), digital video discs or digital versatile disc (DVDs), Blu-ray Disc™, or other optical storage, volatile and non-volatile, removable and non-removable media implemented in any method or technology, random-access memory (RAM), read-only memory (ROM), electrically erasable programmable read-only memory (EEPROM), flash memory or other memory technology. Any such non-transitory computer/processor storage media may be part of a device or accessible or connectable thereto. Any application or module herein described may be implemented using computer/processor readable/executable instructions that may be stored or otherwise held by such non-transitory computer/processor readable storage media.

Note that the expression "at least one of A or B", as used herein, is interchangeable with the expression "A and/or B". It refers to a list in which you may select A or B or both A and B. Similarly, "at least one of A, B, or C", as used herein, is interchangeable with "A and/or B and/or C" or "A, B, and/or C". It refers to a list in which you may select: A or B or C, or both A and B, or both A and C, or both B and C, or all of A, B and C. The same principle applies for longer lists having a same format.

The invention claimed is:

1. A computer-implemented method comprising:
receiving a dataset for an online order;
determining that the dataset includes a first identifier and a second identifier other than the first identifier;
determining that the first identifier contains an error;
comparing the second identifier to a plurality of stored identifiers, each one of the plurality of stored identifiers associated with a respective different user account;
determining, based on the comparison between the second identifier and the plurality of stored identifiers, that the second identifier matches a particular stored identifier of the plurality of stored identifiers, the particular stored identifier associated with a particular user account;
obtaining, from data pertaining to the particular user account, a further stored identifier associated with the particular user account, the further stored identifier being a same type of identifier as the first identifier and the further stored identifier being associated with the particular stored identifier;
determining, based on a comparison between the first identifier and the further stored identifier associated with the particular user account, that the first identifier corresponds to the further stored identifier within a defined tolerance;
generating an option for a user associated with the further stored identifier and the particular user account to confirm an association between the further stored identifier and the online order to merge the online order with the particular user account;
receiving, from a user device associated with the user, a selection of the option to confirm the association between the further stored identifier and the online order; and responsive to receiving the selection, merging the online order with the particular user account by performing operations including storing the association between the further stored identifier and the online order.

2. The method of claim 1, wherein determining that the first identifier contains the error comprises:
   transmitting a message to the first identifier; and
   receiving, in response to the message, an indication that the first identifier contains the error.

3. The method of claim 2, wherein receiving the indication that the first identifier contains the error comprises receiving a delivery failure notification for the message.

4. The method of claim 1, wherein determining that the first identifier corresponds to the further stored identifier within the defined tolerance comprises:
   calculating an edit distance between the first identifier and the further stored identifier; and
   determining that the edit distance is within the defined tolerance.

5. The method of claim 1, wherein the second identifier comprises at least one of a postal address, payment information, telephone number, name, or an internet protocol (IP) address.

6. The method of claim 1, wherein generating the option to confirm the association between the further stored identifier and the online order comprises generating an indication of the option for presentation on a screen page of the particular user account.

7. The method of claim 1, wherein the first identifier comprises an email address.

8. The method of claim 1, wherein the first identifier comprises a telephone number.

9. The method of claim 1, wherein the first identifier comprises a personal identification number.

10. The method of claim 1, wherein determining that the second identifier matches the particular stored identifier comprises determining that the second identifier corresponds to the particular stored identifier within a defined tolerance.

11. The method of claim 10, wherein determining that the second identifier corresponds to the particular stored identifier within the defined tolerance is based on a comparison between the second identifier and each of the plurality of stored identifiers.

12. The method of claim 1, further comprising: after merging the online order with the particular user account, adding the online order to an order history associated with the particular user account.

13. A system comprising:
   memory to store a plurality of stored identifiers, each one of the plurality of stored identifiers associated with a respective different user account; and
   at least one processor to:
      receive a dataset for an online order;
      determine that the dataset includes a first identifier and a second identifier other than the first identifier;
      determine that the first identifier contains an error;
      compare the second identifier to the plurality of stored identifiers;
      determine, based on the comparison between the second identifier and the plurality of stored identifiers, that the second identifier matches a particular stored identifier of the plurality of stored identifiers, the particular stored identifier associated with a particular user account;
      obtain, from data pertaining to the particular user account, a further stored identifier associated with the particular user account, the further stored identifier being a same type of identifier as the first identifier and the further stored identifier being associated with the particular stored identifier;
      determine, based on a comparison between the first identifier and the further stored identifier associated with the particular user account, that the first identifier corresponds to the further stored identifier within a defined tolerance;
      generate an option for a user associated with the further stored identifier and the particular user account to confirm an association between the further stored identifier and the online order to merge the online order with the particular user account; and
      receive, from a user device associated with the user, a selection of the option to confirm the association between the further stored identifier and the online order; and
   wherein the memory is to store the association between the further stored identifier and the online order to merge the online order with the particular user account responsive to receiving the selection.

14. The system of claim 13, wherein the at least one processor is to:
   transmit a message to the first identifier; and
   receive, in response to the message, an indication that the first identifier contains the error.

15. The system of claim 13, wherein the at least one processor is to:
   calculate an edit distance between the first identifier and the further stored identifier; and
   determine that the edit distance is within the defined tolerance.

16. The system of claim 13, wherein the first identifier comprises at least one of an email address, a telephone number or a personal identification number.

17. The system of claim 13, wherein the at least one processor is to determine that the second identifier matches the particular stored identifier by determining that the second identifier corresponds to the particular stored identifier within a defined tolerance.

18. A non-transitory computer readable medium storing computer-executable instructions which, when executed by a computer, cause the computer to:
   receive a dataset for an online order;
   determine that the dataset includes a first identifier and a second identifier other than the first identifier;
   determine that the first identifier contains an error;
   compare the second identifier to a plurality of stored identifiers, each one of the plurality of stored identifiers associated with a respective different user account;
   determine, based on the comparison between the second identifier and the plurality of stored identifiers, that the second identifier matches a particular stored identifier of the plurality of stored identifiers, the particular stored identifier associated with a particular user account;
   obtain, from data pertaining to the particular user account, a further stored identifier associated with the particular user account, the further stored identifier being a same type of identifier as the first identifier and the further stored identifier being associated with the particular stored identifier;
   determine, based on a comparison between the first identifier and the further stored identifier associated with the particular user account, that the first identifier corresponds to the further stored identifier within a defined tolerance;

generate an option for a user associated with the further stored identifier and the particular user account to confirm an association between the further stored identifier and the online order to merge the online order with the particular user account;

receive, from a user device associated with the user, a selection of the option to confirm the association between the further stored identifier and the online order; and responsive to receipt of the selection, merge the online order with the particular user account by performing operations including storing the association between the further stored identifier and the online order.

* * * * *